US012805453B2

(12) United States Patent
Lim

(10) Patent No.: US 12,805,453 B2
(45) **Date of Patent: *Nov. 24, 2026**

(54) APPARATUS FOR CULTIVATING PLANTS

(71) Applicant: LG Electronics Inc., Seoul (KR)

(72) Inventor: Kiyoung Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/173,151

(22) Filed: Apr. 8, 2025

(65) Prior Publication Data

US 2025/0228168 A1 Jul. 17, 2025

Related U.S. Application Data

(63) Continuation of application No. 17/791,151, filed as application No. PCT/KR2020/018448 on Dec. 16, 2020, now Pat. No. 12,279,569.

(30) Foreign Application Priority Data

Jan. 6, 2020 (KR) ........................ 10-2020-0001559
Jan. 6, 2020 (KR) ........................ 10-2020-0001636

(51) Int. Cl.
*A01G 9/24* (2006.01)
*A01G 31/06* (2006.01)

(52) U.S. Cl.
CPC ............. *A01G 9/247* (2013.01); *A01G 9/249* (2019.05); *A01G 31/06* (2013.01)

(58) Field of Classification Search
CPC ...... A01G 9/247; A01G 31/06; F25D 23/061; F25D 23/126
USPC .......................................................... 47/66.6
See application file for complete search history.

(56) References Cited

U.S. PATENT DOCUMENTS 2,659,213 A * 11/1953 Hart ........................ F25D 11/04 165/169
4,162,571 A * 7/1979 Horvay ................. F25D 23/006 29/460
6,536,227 B1 * 3/2003 Lee ......................... F25B 39/02 29/890.038

(Continued)

FOREIGN PATENT DOCUMENTS

CN 103975839 A * 8/2014 ............. A01G 31/06
CN 107750935 A * 3/2018 ............. A01G 31/02

(Continued)

*Primary Examiner* — Kimberly S Berona
*Assistant Examiner* — Erica Michelle Huebner
(74) *Attorney, Agent, or Firm* — Fish & Richardson P.C.

(57) ABSTRACT

An apparatus for cultivating plants includes: a cabinet forming a cultivation space; a machine room configured to be positioned below the cabinet; a bed configured to be mounted inside the cultivation space; a water tank configured to supply water to the bed; and a drain member configured to be positioned between the cultivation space and the machine room. The bed includes a water collecting portion configured to store water and a water supply portion configured to supply water to the water collecting portion. An end portion of a water supply pipe configured to supply water from the water tank to the water supply portion is positioned above the water supply portion, and the drain member is positioned below the water supply portion.

19 Claims, 27 Drawing Sheets

(56) References Cited

U.S. PATENT DOCUMENTS

| | | | | |
|---|---|---|---|---|
| 6,830,075 | B1 * | 12/2004 | McKinney | F16L 3/1236 248/62 |
| 9,032,664 | B2 * | 5/2015 | Yusibov | A01G 31/06 47/62 N |
| 2015/0159934 | A1 * | 6/2015 | Choi | F25D 23/065 62/344 |
| 2017/0003069 | A1 * | 1/2017 | Moertl | F25D 23/126 |
| 2018/0279563 | A1 * | 10/2018 | Wolfe | A01G 9/246 |
| 2018/0325038 | A1 * | 11/2018 | Spiro | A01G 9/047 |
| 2018/0370717 | A1 * | 12/2018 | Voermans | A01G 22/40 |
| 2019/0183062 | A1 * | 6/2019 | Pham | A01G 31/06 |
| 2019/0223391 | A1 * | 7/2019 | Loessl | A01G 9/249 |
| 2019/0223396 | A1 * | 7/2019 | Loessl | A01G 27/003 |
| 2019/0261589 | A1 * | 8/2019 | Pham | A01G 9/027 |

FOREIGN PATENT DOCUMENTS

| | | | | |
|---|---|---|---|---|
| CN | 109156330 | A * | 1/2019 | A01G 7/045 |
| EP | 3005859 | A1 * | 4/2016 | A01G 9/249 |
| JP | 2013051942 | A * | 3/2013 | |
| KR | 200367521 | Y1 * | 11/2004 | A01G 9/0297 |
| KR | 20190102617 | A * | 9/2019 | A01G 27/005 |
| KR | 102034639 | B1 * | 10/2019 | A01G 27/005 |
| KR | 102035326 | B1 * | 10/2019 | G06Q 50/02 |
| WO | WO-2019157598 | A1 * | 8/2019 | A01G 9/247 |

* cited by examiner

APPARATUS FOR CULTIVATING PLANTS

CROSS-REFERENCE TO RELATED APPLICATIONS

This application is a continuation of U.S. application Ser. No. 17/791,151, filed on Jul. 6, 2022, which is a National Stage application under 35 U.S.C. § 371 of International Application No. PCT/KR2020/018448, filed on Dec. 16, 2020, which claims the benefit of Korean Patent Application No. 10-2020-0001559, filed on Jan. 6, 2020, and Korean Patent Application No. 10-2020-0001636, filed on Jan. 6, 2020. The disclosures of the prior applications are incorporated by reference in their entirety.

TECHNICAL FIELD

The present disclosure relates to an apparatus for cultivating plants.

BACKGROUND ART

In general, an apparatus for cultivating plants includes a predetermined cultivating chamber having an environment appropriate to grow the plants, and the plants are stored in the predetermined cultivating chamber. The apparatus for cultivating plants has components to supply nutrients and light energy required for plant growth, and the plants are grown by the supplied nutrients and light energy.

An apparatus for cultivating plants according to the related art is disclosed in Korean Patent Registration No. 10-1240375. In this related art, a structure capable of cultivating plants is disclosed in which multi-stage trays are disposed inside the cabinet, light is irradiated from the light irradiation part to the tray, and the nutrient solution is supplied to the tray through the nutrient solution recovery container, and the inside of the cabinet is maintained at a set temperature by the air conditioning unit and the air circulation fan.

However, in this related art, a structure for preventing water from infiltrating into the electric components constituting the apparatus for cultivating plants during the water supply process is not disclosed, and in view of the structure in which the flow path is connected, the structure can be referred to as a structure in which a separate nutrient solution recovery pipe portion is provided and thus unnecessary nutrient solution is discharged, and in this case, there is problem that the limitation and the management in installation is inconvenient.

DISCLOSURE

Technical Problem

An object of the present disclosure is to provide an apparatus for cultivating plants capable of preventing contamination of a cultivation space and maintaining a sanitary environment at all times.

An object of the present disclosure is to provide an apparatus for cultivating plants capable of disposing pipes for water supply without interfering with the internal configuration of a cultivation space.

An object of the present disclosure is to provide an apparatus for cultivating plants that allows water to be supplied to an accurate position without splashing or leaking when water is supplied to the bed.

An object of the present disclosure is to provide an apparatus for cultivating plants having an improved outer appearance inside a cultivation space.

An object of the present disclosure is to provide an apparatus for cultivating plants having a simple disposition structure of a flow path for water supply and an easy disposition operation.

In addition, an object of the present disclosure is to provide an apparatus for cultivating plants capable of preventing water from overflowing during a water supply process or from penetrating into other components of a product, such as a light assembly, by splashing water.

An object of the present disclosure is to provide an apparatus for cultivating plants capable of draining water without interfering with the internal configuration of a cultivation space even when water flows backward into a water supply portion due to an abnormal situation.

An object of the present disclosure is to provide an apparatus for cultivating plants that allows water to be supplied to an accurate position without splashing or leaking when water is supplied to the bed.

Technical Solution

An apparatus for cultivating plants according to an embodiment of the present disclosure includes a cabinet forming a cultivation space; a pod provided inside the cultivation space and including plant seeds; a bed mounted on the inner wall of the cultivation space so as to be introduced into or withdrawn from the cultivation space; a water collecting portion provided in the bed, recessed so that the pod is seated, and storing water supplied to the pod; a water supply portion provided in the bed and supplying water to the water collecting portion; a pipe guide recessed along the inner wall surface of the cultivation space; a water supply pipe partially accommodated inside the pipe guide and including a water supply pipe end portion protruding from the inner wall of the cultivation space to supply water to the water supply portion; an evaporator provided on the rear wall surface of the cultivation space and heat-exchanging with the cultivation space; and a drain member provided under the evaporator and draining water falling from the evaporator to the outside of the cultivation space; in which, in a state where the bed is introduced into the cultivation space, the water supply portion is positioned below the water supply pipe end portion, and the drain member is positioned below the water supply portion.

A water-through hole communicating with the water collecting portion may be formed on the bottom surface of the pod.

The water supply portion may be formed to protrude rearward from the rear end of the bed.

The bed may include a water guide configured to connect the water supply portion and the water collecting portion, and recessed so that the supplied water moves to the water collecting portion, in which the water supply portion may be positioned higher than the water collecting portion, and the water guide may be formed to have a slope that gradually decreases from the water supply portion toward the water collecting portion.

The water supply portion may have an upper surface opened toward the water supply pipe, and may be recessed downwardly, and water supply portion grooves recessed downward from the upper ends of both sides of the water supply portion may be formed on both sides of the water supply portion.

The water supply pipe end portion protrudes from the inner wall and may be formed bent downward.

The water supply pipe end portion may be formed with a sleeve which is made of a metal material and through which the water supply pipe passes, and the sleeve may extend from the pipe guide toward the bed.

The front end of the opened upper surface of the drain member may be formed to be positioned more forward than the water supply portion.

The drain member may include an inlet having an upper surface open and a structure recessed downward to accommodate water; and a guide extending from one end of the inlet to the inside of the machine room.

A bed rail connecting the bed and the side surface of the cultivation space to guide the introduction or withdrawal of the bed may be provided on both sides of the bed.

The apparatus for cultivating plants may further include a guide cover configured to shield the pipe guide.

The apparatus for cultivating plants may further include a water supply pipe mount formed on the guide cover and configured to fix the end portion of the water supply flow path extending toward the bed.

A blower assembly forming at least a portion of the rear surface of the cultivation space and circulating air in the cultivation space may be provided in front of the evaporator, and the water supply pipe mount may be disposed behind the blower assembly and thus is not exposed to the outside.

A light assembly configured to irradiate light toward another bed disposed below may be provided below the bed, the light assembly may include an LED module including a substrate on which a plurality of LEDs are mounted; and a light case forming a space in which the LED module is accommodated, and the rear end of the light case may include an inclined portion inclined to face downward as the rear end of the light case extends rearward.

The inclined portion may be positioned vertically above the drain member.

Advantageous Effect

The apparatus for cultivating plants according to an embodiment of the present disclosure can expect the following effects.

According to an embodiment of the present disclosure, an openable and closable water tank is provided inside the cultivation space so that the user can additionally supply water. In addition, since a separate line for supplying water to the water tank is not required, there is an advantage that it can be easily installed anywhere a user wants.

Meanwhile, a pipe guide recessed in the inner case forming the side wall surface of the cultivation space may be formed to guide the water supply flow path from the water tank to the multi-stage bed disposed in the cultivation space. The water supply flow path is guided through the pipe guide so that independent water supply is possible for each bed disposed up and down.

In addition, since the water supply flow path is disposed along the side wall of the cultivation space, there is no need to detour the long route for water supply to the bed, and it is accessible through the cultivation space, so that the installation and maintenance of the water supply flow path are easy.

In particular, by disposing the water supply flow path in the recessed pipe guide, it is possible to prevent interference with introduction/withdrawal of the bed provided inside the cultivation space and it is also possible to prevent excessive cooling of the supplied water by preventing interference with the evaporator disposed in the cultivation space.

In addition, the water supply flow path is positioned inside the pipe guide, and is shielded by a plate-shaped guide cover to prevent exposure of the water supply flow path so that the inside of the cultivation space can be seen more clearly.

In addition, a cutout is formed in the pipe guide, and a water supply pipe mount is formed by bending the cutout a number of times to fix the upper water supply pipe and the lower water supply pipe for supplying water to the upper bed and the lower bed.

In particular, the water supply pipe mount can be formed by bending a plurality of times without a separate assembly structure, and thus the water supply pipe can be fixed with a simple structure, thereby improving assembly workability and productivity.

In addition, by the water supply pipe mount, the water supply pipe is capable of maintaining an accurate position above the water supply portion of the bed. Therefore, there is an advantage in that the water supplied through the water supply pipe is able to supply water to the correct position of the bed and it is possible to prevent the water from splashing the water or overflowing by being supplied to another position during the water supply process.

In addition, the water supply pipe may be maintained in a state firmly fixed by the water supply pipe mount to prevent the water supply pipe from being displaced or deformed during cleaning or management of the inside of the cultivation space.

In addition, the water supply pipe may have a structure that is covered by the blower assembly disposed on the rear surface of the cultivation space, thus preventing the water supply pipe from being exposed so that the inside of the cultivation space can be seen more clearly.

In addition, by preventing the water supply pipe and the water supply portion from being exposed, an improved outer appearance of the inside of the cultivation space can be formed, and exposure can be prevented even when water is supplied, thereby preventing contamination of the inside of the cultivation space.

In addition, it is possible to fundamentally prevent the user's contact with the water supply pipe by the blower assembly, and thus there is an advantage in that it is possible to ensure the safety of the user and to prevent the position change and departure of the water supply pipe.

In addition, according to the embodiment of the present disclosure, there is an advantage that the water supply portion and the water supply pipe are provided at the rear end of the inner side of the cultivation space to prevent overflow of water during the water supply process, infiltration into other configurations even if water splashes, or contaminating the inside of the cultivation space.

In addition, since the water supply portion and the water supply pipe are covered by the blower assembly, it is possible to prevent a portion supplied with water from being directly exposed when the door is opened, and water from splashing or penetrating into the cultivation space can be prevented.

In addition, by disposing the water supply portion and the water supply pipe vertically above the drain member, water falling from the water supply portion can be guided to the drain member, and drained to the outside of the cultivation space and thus can be stored in the drain pan inside the machine room. Accordingly, unnecessary moisture does not remain inside the cultivation space, and there is an effect of reducing the possibility of contaminating the cultivation space.

In addition, an inclined portion is provided at the rear end of the light case constituting the light assembly, so that water falling or scattered from the rear end of the bed during the water supply process is moved to the rear end portion by the inclined portion to be capable of falling to the drain member. Accordingly, it is possible to prevent water from penetrating into the light assembly positioned below the bed during the water supply process, and there is an effect of preventing damage to the light assembly.

In addition, since water supply portion grooves are provided on both sides of the water supply portion, even if water flows back into the water supply portion due to excessive water supply, there is an effect that the water does not interfere with the internal configuration of the cultivation space and can be drained.

BEST MODE

Hereinafter, specific embodiments of the present disclosure will be described in detail with drawings. However, the present disclosure cannot be said to be limited to the embodiments in which the spirit of the present disclosure is presented, and other disclosures that are degenerative by addition, change, deletion, or the like of other components or other embodiments included within the scope of the present disclosure are easily suggested.

Figure 1:
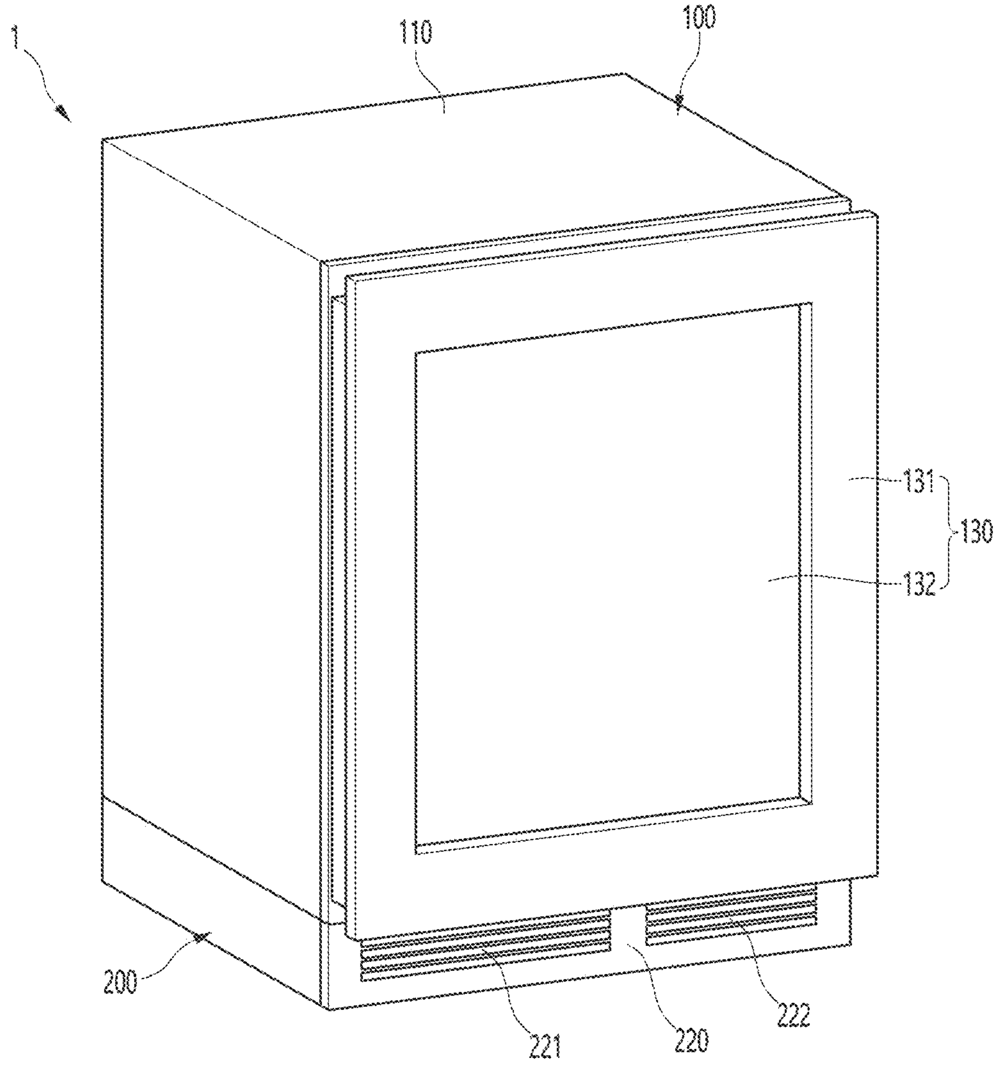
FIG. 1 is a perspective view illustrating an apparatus for cultivating plants according to an embodiment of the present disclosure.
Figure 2:
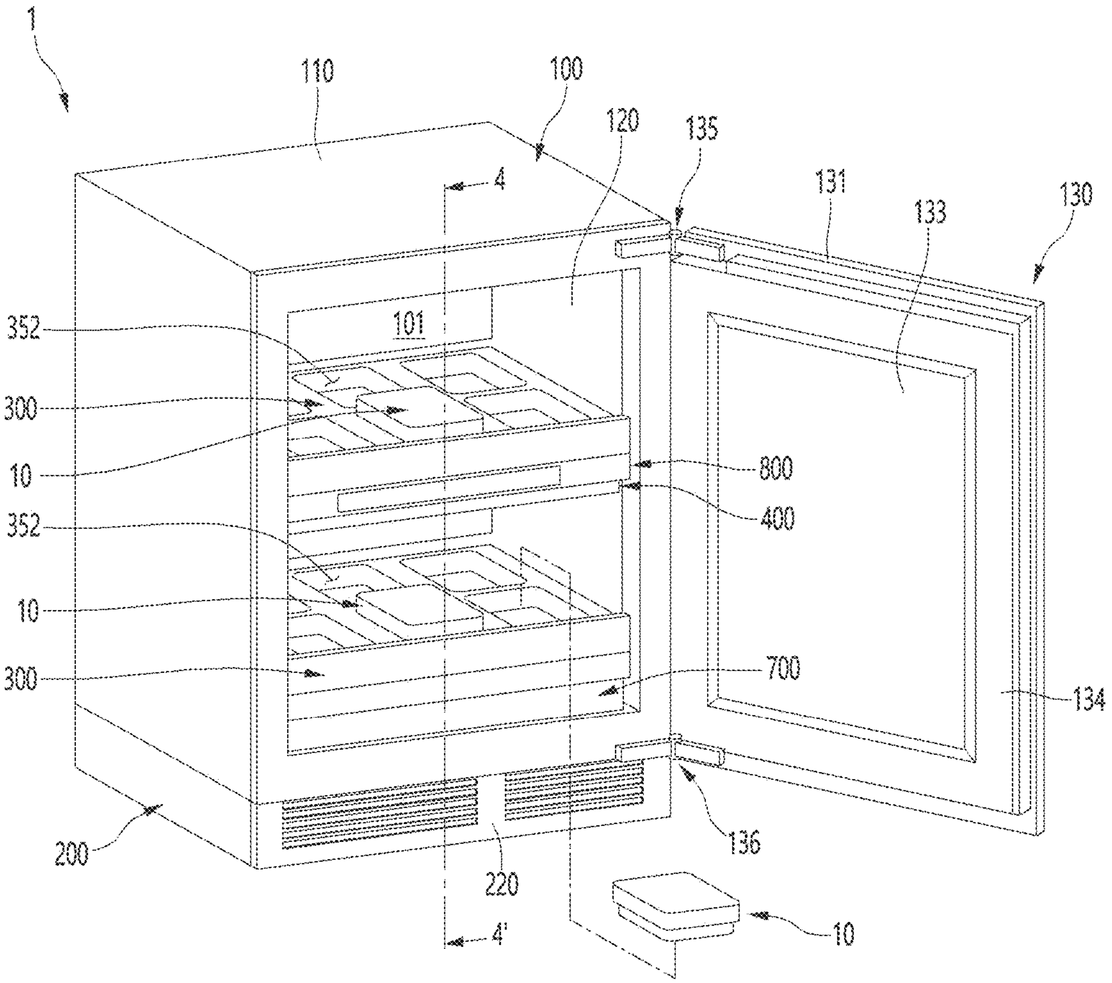
FIG. 2 is a perspective view illustrating a state where a door of the apparatus for cultivating plants is opened.
Figure 3:
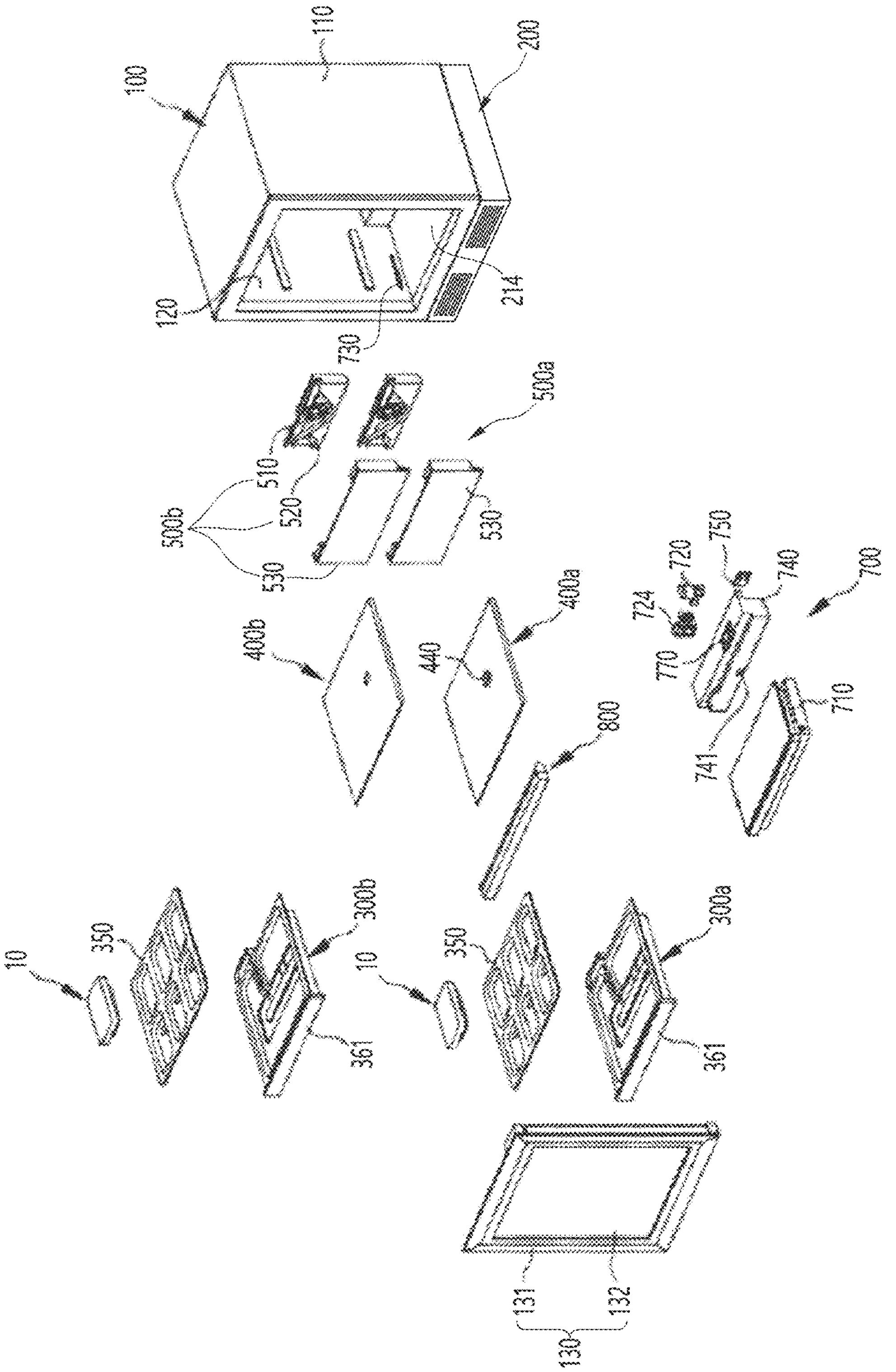
FIG. 3 is an exploded perspective view illustrating the apparatus for cultivating plants.
Figure 4:
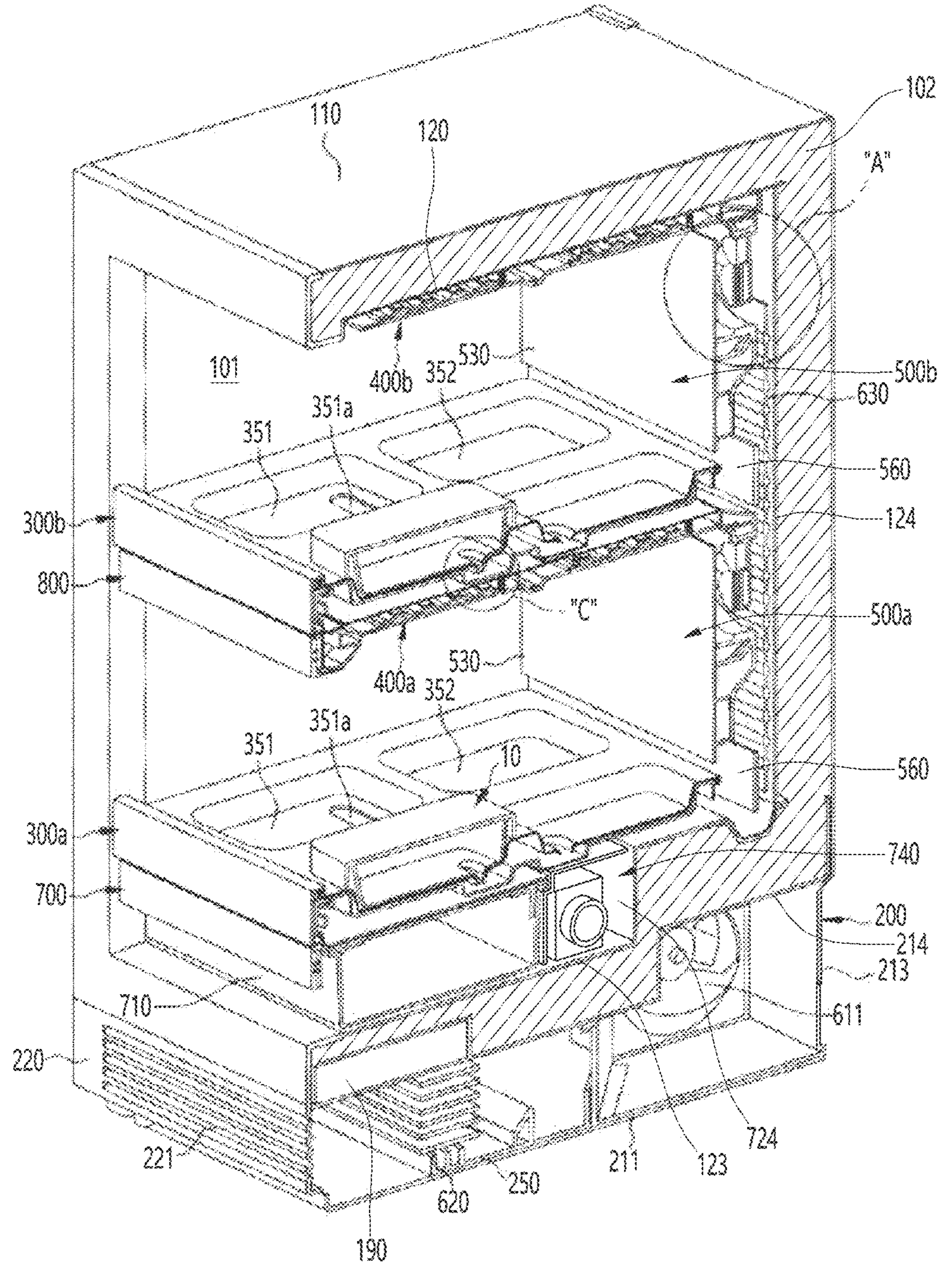
FIG. 4 is a cutaway perspective view taken along line 4-4' of FIG. 2.
Figure 5:
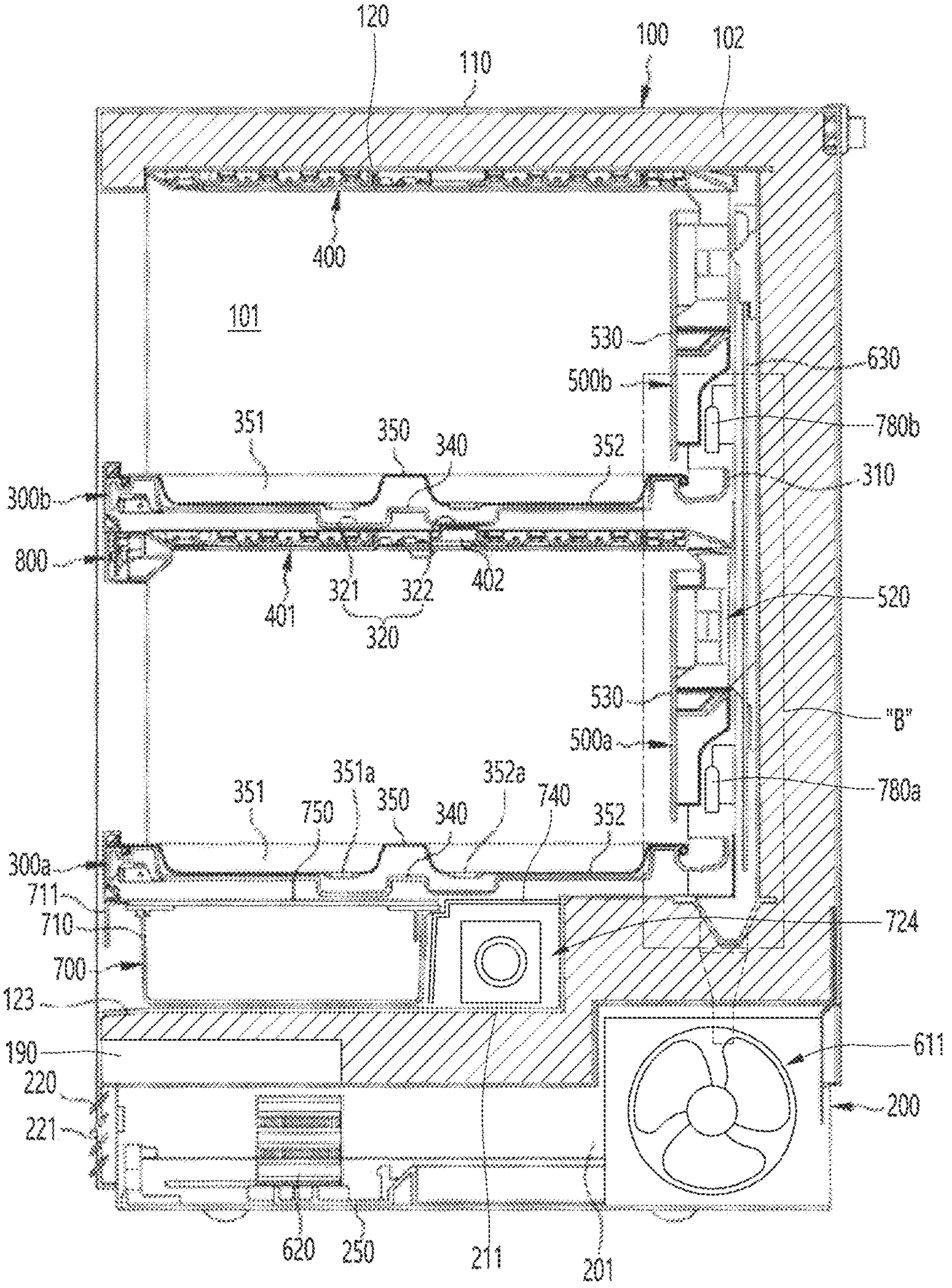
FIG. 5 is a longitudinal cross-sectional view illustrating the cabinet.

FIG. 1 is a perspective view illustrating an apparatus for cultivating plants according to an embodiment of the present disclosure, FIG. 2 is a perspective view illustrating a state where a door of the apparatus for cultivating plants is opened, FIG. 3 is an exploded perspective view illustrating the apparatus for cultivating plants, FIG. 4 is a cutaway perspective view taken along line 4-4' of FIG. 2, and FIG. 5 is a longitudinal cross-sectional view illustrating the cabinet.

Looking at the whole with respect to the apparatus for cultivating plants 1 according to the embodiment of the present disclosure with reference to the drawings, the outer appearance thereof may be formed by a cabinet 100 forming a space in which a plant is cultivated therein, and a door 130 for opening and closing the cabinet 100. In this case, the cultivated plant is usually edible by the user, such as leaf vegetables and herbs that can be used for wrapping or salads, and is easy to cultivate, and it is preferable that plants that do not occupy a lot of space are cultivated, and may be provided in the form of a pod 10 which includes seeds and nutrients. Accordingly, the pod 10 may be referred to as a seed package.

The cabinet 100 is formed to have an open front surface, and a cultivation space 101 may be provided therein. The cabinet 100 may include an outer case 110 forming an outer appearance and an inner case 120 forming the cultivation space 101, and an insulating material 102 may be provided between the outer case 110 and the inner case to insulate the cultivation space and maintain the cultivation space 101 at a set temperature.

The outer case 110 and the inner case 120 may be formed of a metal material and may be formed by combining a plurality of plate-shaped materials with each other. In particular, the inner case 120 may have both side surfaces, a rear surface, and an upper surface formed in a metal plate shape and may be coupled to each other.

A plurality of beds 300 may be vertically disposed inside the cabinet 100. In this embodiment, two beds 300*a* and 300*b* are vertically provided and may have the same structure. The beds 300 may be referred to as an upper bed 300*b* and a lower bed 300*a*, respectively, for convenience of explanation and understanding. Of course, two or more beds 300 may be provided according to the size of the cabinet 100.

The bed 300 may have a structure in which a plurality of pods 10 containing plant seeds and nutrients necessary for cultivation are seated. The bed 300 may be referred to as a shelf or a tray. In addition, the bed 300 may have a structure in which the pod 10 can be seated and maintained in a seated state. In addition, the bed 300 may have a structure which easily seats the pod 10 and can introduce/withdraw so that management and harvesting of plants growing in the pod 10 is facilitated.

In addition, the bed 300 may have a structure in which water supplied from the water tank 700 flows and is delivered to all the pods 10 seated on the bed 300. In addition, the bed 300 may maintain an appropriate water level so as to constantly supply moisture to the pod 10.

Meanwhile, a machine room 200 may be provided below the cabinet 100. In the machine room 200, a compressor 610 and a condenser 620 constituting a refrigeration cycle for adjusting the temperature of the cultivation space 101 may be disposed.

In addition, a grill cover 220 may be provided on the front surface of the machine room 200, and the grill cover 220 may include a grill suction port 221 through which air is suctioned into the machine room 200, and a grill discharge port 222 through which internal air of the machine room 200 is discharged.

Meanwhile, the internal temperature of the cultivation space may be adjusted by the refrigeration cycle 600. In this case, the evaporator 630 may be disposed on the inner rear wall surface of the cultivation space 101. The evaporator 630 may be provided with a roll bond type heat exchanger and may be referred to as a heat exchanger. The evaporator 630 may have a plate-shaped structure that is easily attached to the rear wall surface of the cultivation space 101. In addition, the evaporator 630 minimizes the loss of the cultivation space 101 due to the plate-like structure and is close to the cultivation space 101 to effectively adjust the temperature of the cultivation space 101.

A heater (not illustrated) may be provided on the rear wall surface of the cultivation space 101. Accordingly, heating and cooling may be performed in the rear area of the cultivation space. The interior of the cultivation space 101 by the evaporator 630 and the heater may maintain a temperature suitable for plant growth (e.g., 18° C.-28° C.). Of course, if necessary, a configuration for heating other than the heater may be provided, and various heating methods such as a heating structure through hot gas or a heating structure through conversion of a refrigeration cycle will be possible. The temperature inside the cultivation space 101 is sensed by the internal temperature sensor 450, and can be kept constant regardless of the external temperature of the cabinet 100.

In addition, a blower assembly 500 may be provided in front of the evaporator 630. The blower assembly 500 may circulate the interior of the cultivation space 101 to uniformly cool or heat the cultivation space 101.

The blower assembly 500 may include an upper blower assembly **500*b* disposed in an upper space divided by the bed 300 and a lower blower assembly 500*a* disposed in a lower space. The blower assembly 500 disposed vertically has the same structure and shape, except that there is a difference only in the mounting position. The blower assembly 500 may be provided by a number corresponding to the number of the beds 300 and may blow air from the rear toward the front of the bed 300. Accordingly, independent air circulation can be achieved in each space of the interior of the cultivation space 101 partitioned by the bed 300**.

The air in the interior of the cultivation space is circulated by the blower assembly 500, and in particular, the circulated air passes through the evaporator 630 so that the entire interior of the cultivation space 101 has a uniform temperature, while temperature adjustment can be rapidly achieved. In addition, the air circulated by the blower assembly 500 may flow while passing through the upper surface of the bed 300 and the lower surface of the light assembly 400.

The air flowing by the blower assembly 500 passes through the upper surface of the bed 300 to make the respiration of the plants grown in the bed 300 more smooth and to make the plants to be shaken appropriately and thus the air can provide the optimal airflow necessary for growth by controlling stress. In addition, the air flowing by the blower assembly 500 can prevent overheating of the light assembly 400 while passing through the lower surface of the light assembly 400.

Meanwhile, the light assembly 400 may be provided above the bed 300. The light assembly 400 provides light necessary for plants by irradiating light toward the bed 300. In this case, the amount of light irradiated by the light assembly 400 may be set to be similar to sunlight, and the amount of light and irradiation time optimized for the cultivated plant may be set.

The light assembly 400 may include an upper light assembly **400*b* provided in an upper space partitioned by the bed 300 and a lower light assembly 400*a* provided in a lower space. The upper light assembly 400*b* may be mounted on an upper surface of the cultivation space 101, and the lower light assembly 400*a* may be mounted on a lower surface of the upper bed 300*b***.

In other words, the upper light assembly **400*b* and the lower light assembly 400*a* may be positioned vertically above the bed 300 disposed below, respectively, and on the upper surface of the partitioned cultivation space 101, it is possible to adjust the growth of cultivated plants by irradiating light toward the bed 300**.

A water tank 700 may be provided on a bottom surface inside the cabinet 100. The water tank 700 may store water supplied to the bed 300. The water tank 700 may be positioned below the bed 300 positioned at the lowermost position among the plurality of beds 300, and the front surface the water tank may be positioned at a position corresponding to the front end of the bed 300.

The length of the water tank 700 in the horizontal direction may correspond to the width of the internal space of the cabinet 100. In addition, the length of the water tank 700 in the vertical direction may be formed to correspond to a distance between the bed 300 positioned at the lowermost position and the bottom surface of the cultivation space 101. In other words, the water tank 700 may be formed to fill the entire space below the lower bed **300*a* positioned at the lowermost position, and the space behind the water tank 700 can be covered by the water tank 700**.

A pump cover 740 may be provided in a space behind the water tank 700 covered by the water tank 700. A water pump 720 and a water supply valve 724 to be described below may be provided inside the pump cover 740. The pump cover 740 and the internal components of the pump cover 740 and the pipe connected to the components may be referred to as a water supply unit or a water supply module.

The water tank 700 may be provided in the interior of the cultivation space 101 to be capable of being introduced or withdrawn in a front and rear direction. To this end, tank rails 730 for guiding the introduction/withdrawal of the water tank 700 may be provided on both sides of the water tank 700 in the left and right directions. In addition, the water tank 700 may be opened in a state of being introduced or withdrawn to have a structure in which water can be additionally supplied.

Meanwhile, the display assembly 800 may be provided in the opened front half portion of the cabinet 100. The display assembly 800 may output the operating state of the apparatus for cultivating plants 1 to the outside. In addition, the display assembly 800 may be provided with a manipulation part to which a user's manipulation is input to set and input the overall operation of the apparatus for cultivating plants. For example, the display assembly 800 may include a touch screen structure and may include a structure such as a button or a switch.

The door 130 may have a size capable of shielding the opened front surface of the cabinet 100. In addition, an upper hinge 135 and a lower hinge 136 may be shaft-coupled to the upper end and lower end of one of the sides of the door 130 in the left and right direction. The door 130 may be rotatably coupled to the cabinet 100 by the upper hinge 135 and the lower hinge 136, and the cultivation space 101 can be opened and closed by the rotation of the door 130.

At least a part of the door 130 may have a see-through structure, and the cultivation space 101 may be checked even when the door 130 is closed.

In detail, the door 130 may include a door frame 131 forming a circumference and having an opening in the center, and door panels 132 and 133 for shielding the opening of the door frame 131. The door panels 132 and 133 may be formed of glass or a transparent plastic material to have a structure in which the inside can be seen through. In addition, the door panels 132 and 133 may have a color or a colored coating, metal deposition, or film attached thereto so that the cultivation space 101 is selectively visible or invisible.

Meanwhile, a plurality of the door panels 132 and 133 may be disposed in the front and rear direction, and an insulating space may be formed between the plurality of door panels 132 and 133. In addition, if necessary, the door panels 132 and 133 may include insulating glass. Accordingly, it is possible to insulate the inside and the outside of the cabinet 100.

In addition, if necessary, the entire front outer appearance of the door 130 may be formed by the door panel 132 disposed on the front surface of the door 130.

In addition, a gasket 134 may be provided on the rear surface of the door 130. The gasket 134 may be disposed along a position corresponding to the circumference of the opened front surface of the cabinet 10. Accordingly, in a state where the door 130 is closed, the opened front surface of the cabinet 10 may be sealed by the gasket 134, and a space between the cabinet 10 and the door 130 may be sealed by the gasket 134.

Meanwhile, components of reference numerals not described in FIGS. 1 to 5 will be described below.

Hereinafter, the structure of the apparatus for cultivating plants 1 having the above structure will be described in more detail with reference to the drawings for each configuration.

Figure 6:
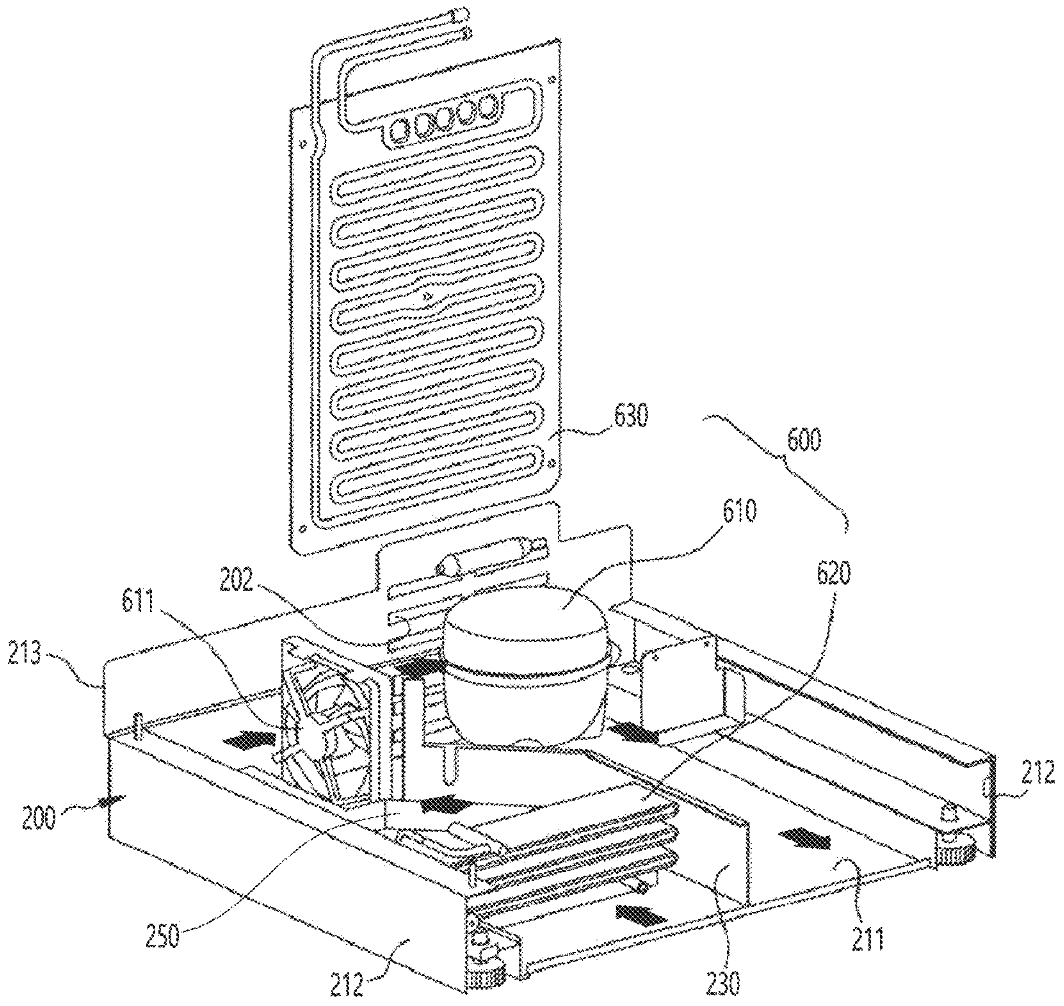
FIG. 6 is a perspective view illustrating the internal structure of a machine room of the apparatus for cultivating plants.

FIG. 6 is a perspective view illustrating the internal structure of the machine room of the apparatus for cultivating plants.

As illustrated, the machine room 200 is mounted on the lower surface of the cabinet 100 and forms a space independent from the cultivation space 101 under the cabinet 100. The machine room 200 may be configured by a bottom plate 211 forming a lower surface, a pair of side plates 212 forming both side surfaces, and a rear plate 213 forming a rear surface.

The bottom plate 211, the side plate 212, and the rear plate 213 may be coupled in a single module form to be referred to as a machine room frame. The space formed by the machine room frame may be formed so that the upper surface and the front surface are opened. Accordingly, the machine room frame is coupled to the lower surface of the cabinet 100 to form the machine room 200 space under the cabinet 100.

The internal space of the machine room 200 may be partitioned by a barrier 230. The barrier 230 may extend backward from the opened front end of the machine room 200. A condenser 620 may be provided in a space on the left side partitioned by the barrier 230, and a compressor 610 may be provided on a space on the right side partitioned by the barrier 230. In addition, a heat dissipation fan 611 for forcibly flowing air from the left to the right may be provided at the rear end of the barrier 230.

Meanwhile, a grill cover 220 may be provided on the opened front surface of the machine room 200. The grill cover 220 shields the open front surface of the machine room 200, a grill suction port 221 is formed in the front surface of the left space partitioned by the barrier 230, and a grill discharge port 222 may be formed in the front surface of the right space, respectively.

Accordingly, when the heat dissipation fan 611 is driven, external air is suctioned and flows into the left space of the machine room 200 through the grill suction port 221, and the suctioned air exchanges heat with the refrigerant in the condenser 620 while passing through the condenser 620. Then, the air passing through the heat dissipation fan 611 cools the compressor 610 while passing through the compressor 610. Also, the air passing through the compressor 610 may be discharged forward through the grill discharge port 222.

In other words, in a state where the apparatus for cultivating plants 1 is installed, both the suction of external air and the discharge of the air inside the machine room 200 are performed from the front while passing through the grill cover 220. Accordingly, the apparatus for cultivating plants 1 can be installed even in a space where the left and right sides and the rear surface are blocked. In particular, even if the apparatus for cultivating plants 1 is installed in a piece of furniture such as a sink as a built-in, cooling and heat exchange of the compressor 610 and the condenser 620 inside the machine room 200 can be effectively performed.

Meanwhile, the evaporator 630 constituting the refrigerating cycle 600 is provided inside the cabinet 100, is vertically disposed on the rear surface of the cultivation space 101, and can be easily connected by components and refrigerant pipes in the machine room 200.

Meanwhile, a drain member 260 for draining water falling from the evaporator 630 into the machine room 200 may be provided vertically below the evaporator 630.

In addition, the drain member 260 may be provided at the rear end of the bottom surface of the cultivation space 101. In other words, the drain member 260 is positioned below the cultivation space 101, and water discharged from the cultivation space 101 together with water generated by dew condensation on the surface of the evaporator 630 can be guided to the machine room 200 through the drain member 260.

The drain member 260 is formed to extend along the rear end of the lower surface of the inner case 120. In addition, the drain member 260 has an inlet 261 having an open upper surface and a structure recessed downward to accommodate the falling water and may be composed of a guide 262 extending to the inside of the machine room 200 from one end of the inlet 261.

In detail, an end portion of the water supply pipe, an inclined portion 418 of the light case 410, an evaporator 630, and a water supply portion 310 may be disposed above the opened upper surface of the inlet 261. In other words, it may be configured so that water falling within a region vertically upward of the opened upper surface of the inlet can be collected.

The front end of the opened upper surface may be formed to be positioned further forward than the water supply portion 310 and the water supply pipes 780*a* and 780*b*. Accordingly, the water discharged through the water supply pipes 780*a* and 780*b* splashes while falling downward to the water supply portion 310, or the water overflowing from the water supply portion 310 to the outside falls and can be made to flow into the open upper surface of the drain member 260.

In other words, all of the water supply portions 310 of the plurality of beds are disposed vertically above the open upper surface of the drain member 260 and has a structure in which all of the water scattered by overflowing or splashing water can be directed to the drain member 260 during the water supply process.

In addition, the inlet 261 may be formed to be slightly inclined so that the falling water can flow toward the guide 262. In other words, the side of the inlet 261 adjacent to the guide 262 may be positioned below the other side of the inlet 261.

The guide 262 may extend into the machine room 200 from one end of the inlet 261 positioned vertically below the water supply portion 310. In detail, the guide 262 may be positioned at a rear part of the condenser 620 and positioned at one side of the heat dissipation fan 611.

A lower end of the guide 262 may be opened toward the drain pan 250 to guide the falling water to the drain pan 250. In detail, the opening at the lower end of the guide 262 may be positioned in the inner region of the drain pan 250 and can store water falling to the machine rood 250 without interfering with other components in the machine room 200.

In addition, the guide 262 may be formed to have a smaller diameter step by step from the upper portion to the lower portion. In other words, the diameter of the opening on the lower surface facing the drain pan 250 may be smaller than the diameter of the opening on the upper surface of the guide 252. Accordingly, the water falling from the guide 252 can accurately fall to a position corresponding to the drain pan 250 without interfering with other components positioned in other machine rooms 200.

Meanwhile, a drain pan 250 is provided in the machine room 200. In this case, the drain pan 250 is provided below the condenser 620, and the drain pan 250 may store condensed water flowing down from the drain member 260.

The drain pan 250 may extend to a position corresponding to the guide 262 of the drain member 260. Accordingly, the defrost water generated by the evaporator 630 and the water flowing down from the water supply portion 310 may be guided to the drain pan 250 by the guide 262 of the drain member 260 and stored.

In other words, the drain member 250 is provided vertically below the evaporator 630 to drain water falling from the evaporator 630 into the machine room 200, and the drain pan 250 is provided in the machine room 200, and water falling from the drain member 250 is stored. In addition, the water supply portion 310 and the end portions of the water supply pipes 780*a* and 780*b* may be disposed vertically above the opened upper surface of the drain member 250.

In addition, the drain pan 250 forms a circumference extending upward from the floor of the machine room 200 to store water falling from the water supply portion 310, the evaporator 630, or the like, and it is also possible to provide an independent space without interfering with the heat dissipation fan 622.

The drain pan 250 may extend from the rear of the condenser 620 to the rear end of the machine room 200. In addition, the front end surface of the drain pan 250 may be formed to be equal to or smaller than the size of the rear surface of the condenser 620. In addition, one side bent rearwardly extended from the front end surface of the drain pan 250 may be inclined in a direction closer to the heat dissipation fan 611 toward the rear to a position corresponding to the front end of the heat dissipation fan 611. In addition, the one side may be bent at the front end of the heat dissipation fan 611 and be formed parallel to the side end of the heat dissipation fan 611 to shield a portion of the heat dissipation fan 611. In addition, the rear surface of the drain pan 250 may be formed to be spaced apart parallel to the rear surface of the machine room 200.

Meanwhile, the water stored in the drain pan 250 may be evaporated by heat from a pipe connecting the compressor 610 and the condenser 620. In other words, the water stored in the drain pan 250 may not be discharged to the outside through a separate pipe, but may be evaporated by heat generated from a high-temperature pipe connecting the compressor 610 and the condenser 620.

In detail, a pipe 612 connecting the compressor 610 and the condenser 620 may pass through the inside of the drain pan 250. The pipe 612 may extend in both front and rear directions inside the drain pan 250. In addition, the pipe 612 may be fixed to the bottom of the drain pan 250 by a fixing pin, and water discharged from the cultivation space 101 may be stored. In addition, evaporation of the water accumulated in the drain pan 250 may be promoted through the connection pipe 612.

Meanwhile, the upper side of the machine room 200 may be provided with a controller 190 for controlling the operation of each component of the apparatus for cultivating plants. For example, the controller 190 may be provided between the upper surface of the machine room and the inner bottom surface of the cultivation space 101 and may be accessible by opening the grill cover 220. Therefore, even when the apparatus for cultivating plants is installed and in use, the controller 190 can be easily accessed, and maintenance can be facilitated.

Figure 7:
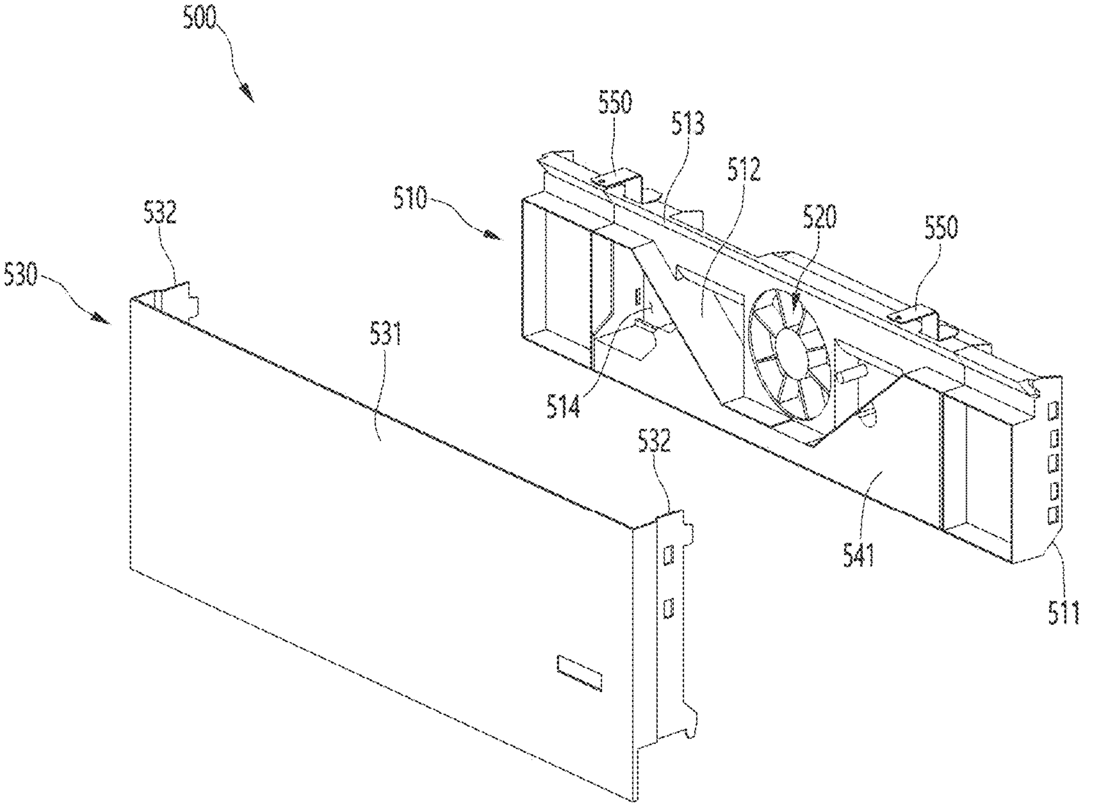
FIG. 7 is an exploded perspective view illustrating a blower assembly of the apparatus for cultivating plants viewed from the front.
Figure 8:
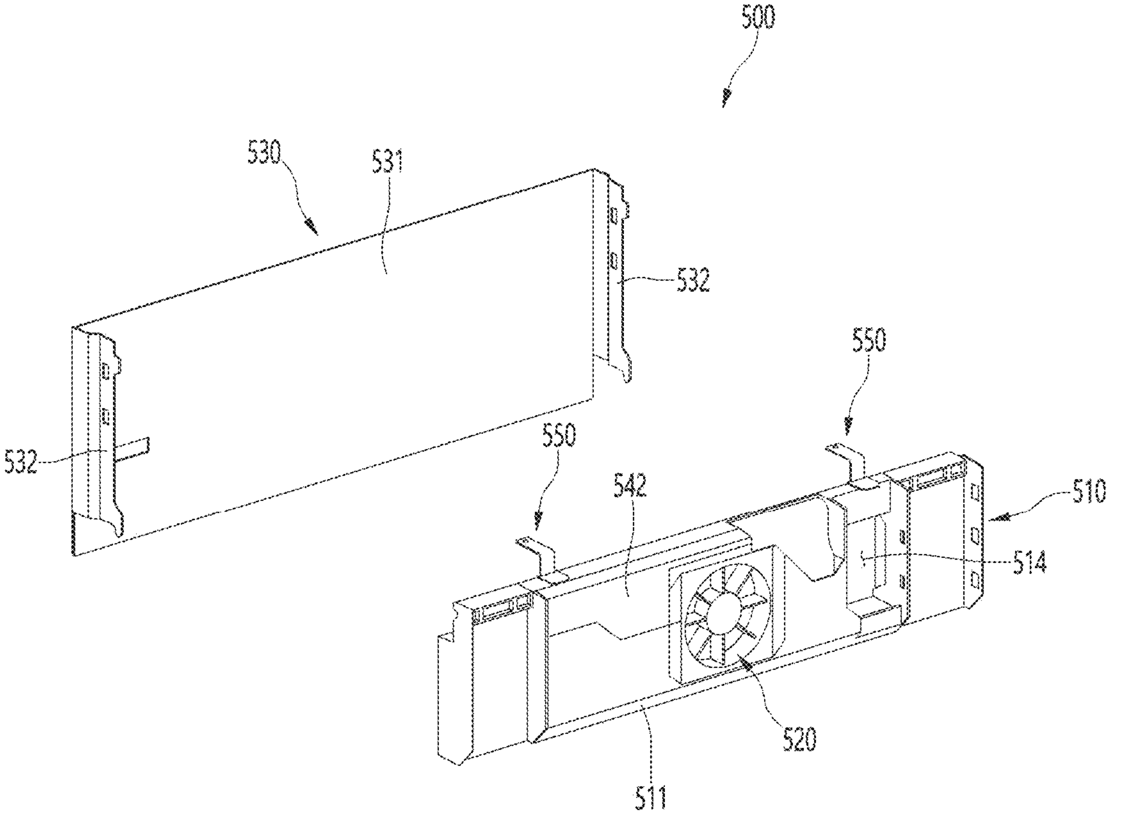
FIG. 8 is an exploded perspective view illustrating the blower assembly viewed from the rear.
Figure 9:
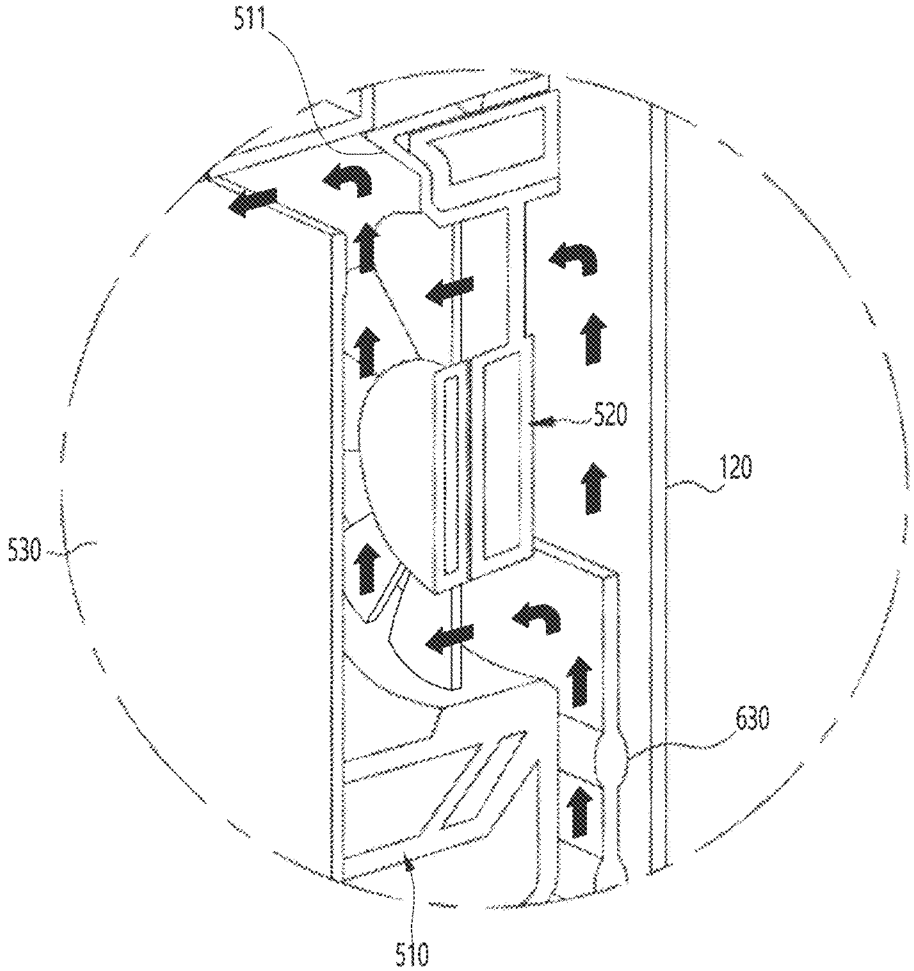
FIG. 9 is an enlarged view illustrating part “A” of FIG. 4.

FIG. 7 is an exploded perspective view illustrating the blower assembly of the apparatus for cultivating plants viewed from the front, FIG. 8 is an exploded perspective view illustrating the blower assembly viewed from the rear, and FIG. 9 is an enlarged view illustrating part "A" of FIG. 4.

As illustrated in the drawing, the evaporator 630 may be provided on the rear wall surface of the cultivation space 101, and the blower assembly 500 may be provided in front of the evaporator 630.

The blower assembly 500 is configured to circulate air above the cultivation space 101 partitioned by the bed 300. Accordingly, the blower assembly 500 is provided in a number corresponding to the number of the beds 300 and is provided at the lower end of the light assembly 400 and at an upper portion adjacent to the bed 300.

As illustrated in the drawing, the blower assembly 500 may include a blower fan 520, a fan guide 510 to which the blower fan 520 is mounted, and a blower cover 530 shielding the fan guide 510 and the evaporator 630.

In detail, the blower fan 520 is formed in the shape of a box fan and may be provided in the center of the fan guide 510. In addition, the blower fan 520 may discharge the air flowing thereinto from the rear to the front of the blower assembly 500.

The fan guide 510 provides a space in which the blower fan 520 is mounted and is configured to guide the discharge of air discharged by the blower fan 520. The fan guide 510 is injection-molded with a plastic material, and the blower fan 520 may be mounted in the center of the rear surface of the fan guide 510.

Meanwhile, an air guide 512 is formed on the front surface of the fan guide 510 to guide air discharged from the blower fan 520 upward. The air guide 512 may be provided on both sides in the left and right direction with respect to the center of the blower fan 520 and may be configured to become wider toward the upper side. Accordingly, the air discharged by the blower fan 520 flows along the inclined surface and may become closer to the discharge port formed at the upper end of the fan guide 510 toward the outside.

A discharge guide 513 may be formed on the front upper end of the fan guide 510. The discharge guide 513 forms a surface that protrudes forward from the lower side to the upper side. In other words, the discharge guide 513 forms an inclined surface or a round surface, and guides the air flowing from the lower side to the upper side toward the front. At this time, since the end portion of the discharge guide 513 is adjacent to the lower surface of the light assembly 400, the air discharged from the blower assembly 500 can flow from rear end to the front side of the lower surface of the light assembly 400 by the discharge guide 513. The light assembly 400 can be cooled when the light assembly 400 is heated by such an air flow.

A connector hole 514 may be formed at one side of the fan guide 510. The connector hole 514 is formed to be opened at a position corresponding to the connector 124*a* mounted on the rear wall surface of the inner cultivation space. Therefore, when the blower assembly 500 is mounted, the connector 124*a* is inserted into the connector hole 514 so as not to interfere with each other. In addition, the electric wire connected to the blower fan 520 may be connected to the connector exposed through the connector hole 514.

Blower brackets 550 that are inserted into and mounted on the blower assembly mount 415 may be provided on both sides of the upper surface of the fan guide 510 in the left and right direction. One end of the blower bracket 550 may be coupled to the upper surface of the fan guide 510, and the other end thereof may be mounted to the blower assembly mount 415 formed at the rear end of the lower surface of the light assembly 400. Accordingly, the light assembly 400 and the blower assembly 500 may be coupled to each other in a vertically intersecting form. In addition, the blower assembly 500 may discharge air from the rear end of the light assembly 400 toward the front.

In addition, an inlet guide 511 may be formed on a lower surface of the fan guide 510. The inlet guide 511 may be inclined upward toward the rear and may guide air suctioned in from the lower side of the fan guide 510 to smoothly flow to the rear of the fan guide 510.

In addition, recessed spaces are formed in the front and rear surfaces of the fan guide 510, and a front insulating material 541 and a rear insulating material 542 may be disposed inside the recessed space, respectively. Accordingly, it is possible to prevent the cold air generated in the evaporator 630 from being transmitted to the front directly through the blower assembly 500.

Meanwhile, the blower cover 530 may shield the fan guide 510 and components mounted on the fan guide 510 in front of the fan guide 510. In addition, the blower cover 530 is extended to a position adjacent to the upper end of the bed to be capable of preventing the evaporator 630 and the rear wall surface of the inner case 120 from being exposed in a case where the blower assembly 500 is mounted.

In addition, the blower cover 530 and the bed 300 may be slightly spaced apart to each other, and the air flowing into the rear along the bed 300 through between the lower end of the blower cover 530 and the upper surface of the bed 300 may be suctioned to face the blower fan 520.

At this time, in order to prevent the evaporator 630 from being exposed through the gap between the blower cover 530 and the bed 300, a shielding plate 560 can be further provided in a corresponding area of the evaporator 630.

The blower cover 530 may form the outer appearance of the rear wall surface of the cultivation space 101.

The blower cover 530 may be formed of the same metal material as the inner case 120 and may be formed by bending a plate-shaped material. The blower cover 530 may include a front portion 531 and a side portion 532.

The front portion 531 may be exposed through the cultivation space 101 and may be formed to correspond to a horizontal length of the cultivation space 101. In addition, the upper end of the front portion 531 may be positioned adjacent to the upper end of the fan guide 510 and the upper end of the light assembly 400, and serves as an outlet through which the air substantially discharged by the blower fan 520 is discharged into the cultivation space 101. The lower end of the front portion 531 may extend further downward than the lower end of the fan guide 510 and may be positioned adjacent to the upper surface of the bed 300, and serves as a suction port in which air suctioned substantially toward the blower fan 520 flows.

In other words, by the blower cover 530, the rear components are shielded and the rear outer appearance of the cultivation space 101 is formed, and at the same time, the blower cover may serve as a suction port for air flowing along the bed 300 and a discharge port for air discharged along the light assembly 400 so that air circulates in the cultivation space 101. In particular, the structure of the blower assembly 500 may allow air to flow along the bed 300 and the light assembly 400, and while flowing along the rear of the fan guide 510, the evaporator 630 or the air cooled or heated by the heater continuously circulates inside the cultivation space 101, so that the temperature of the cultivation space 101 can be adjusted. Through this continuous circulation of air, the cultivation space 101 maintains a constant temperature as a whole, and the inside of the cultivation space can be in an optimal state, such as providing airflow for plants to grow inside the bed 300.

The side portion 532 may be bent backward at both ends of the front portion 531 and may be coupled to both side surfaces of the fan guide 510. The side portion 532 may have a coupling structure corresponding to the side surface of the fan guide 510 and may be coupled to each other by the elasticity of the side portion 532 itself without fastening a separate coupling member.

Figure 10:
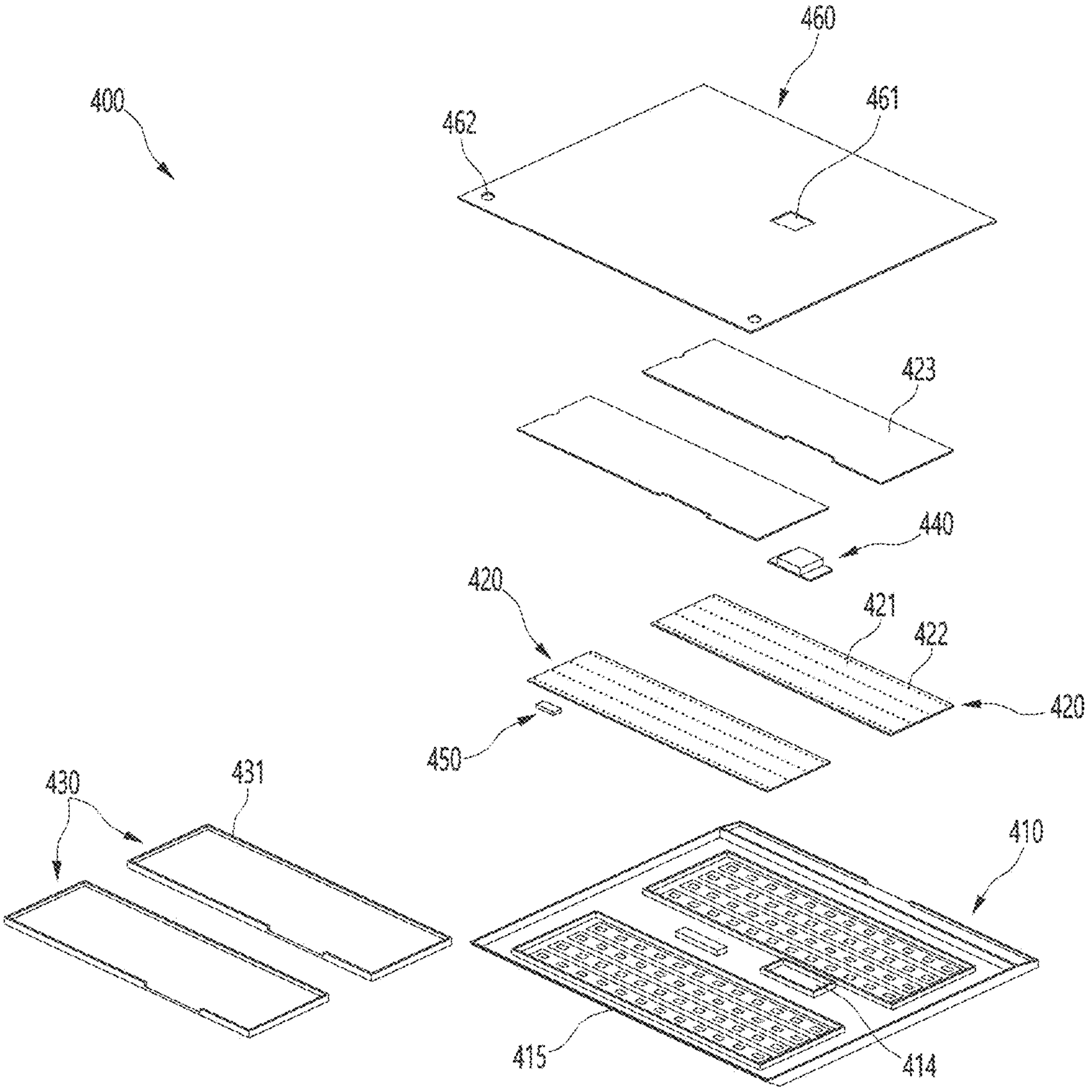
FIG. 10 is an exploded perspective view illustrating the light assembly of the apparatus for cultivating plants.
Figure 11:
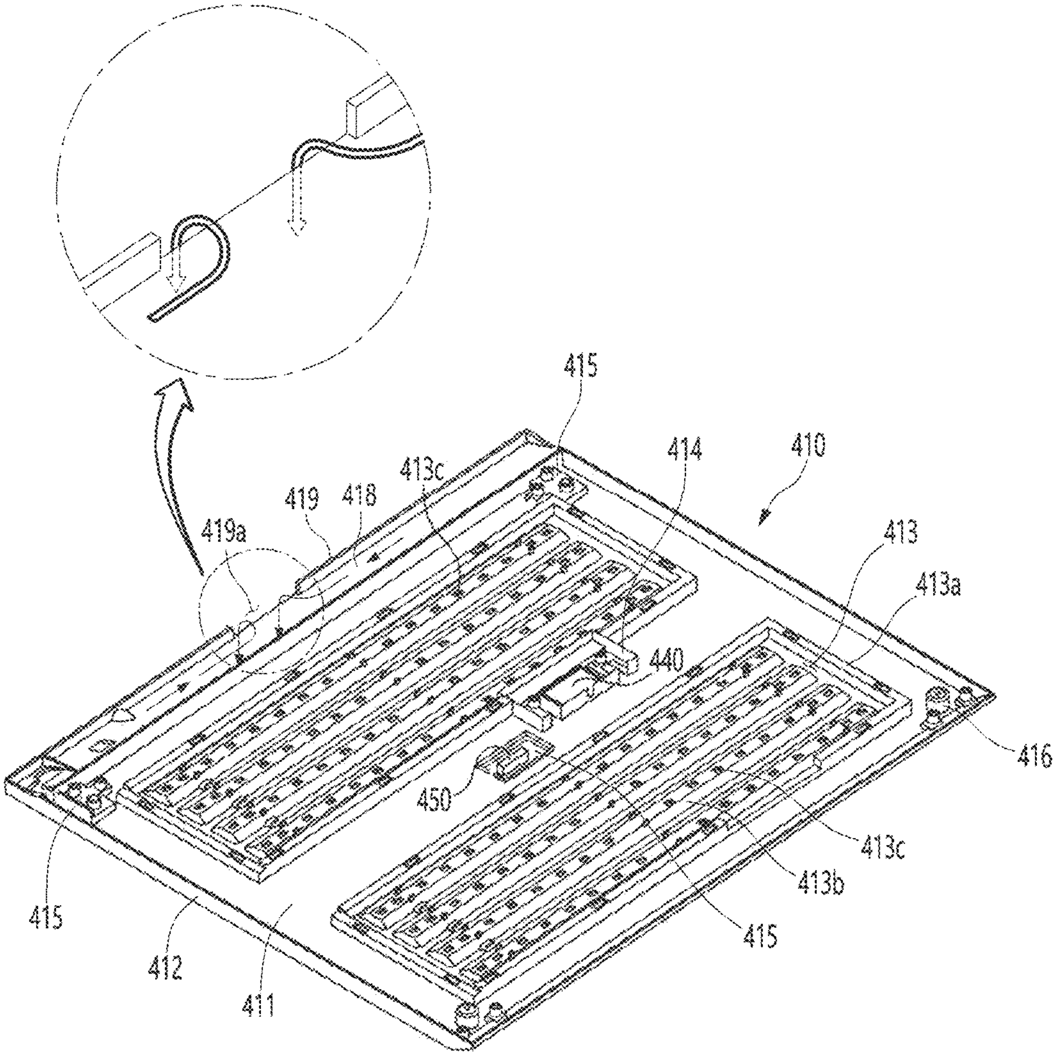
FIG. 11 is a perspective view illustrating a light case of the light assembly.
Figure 12:
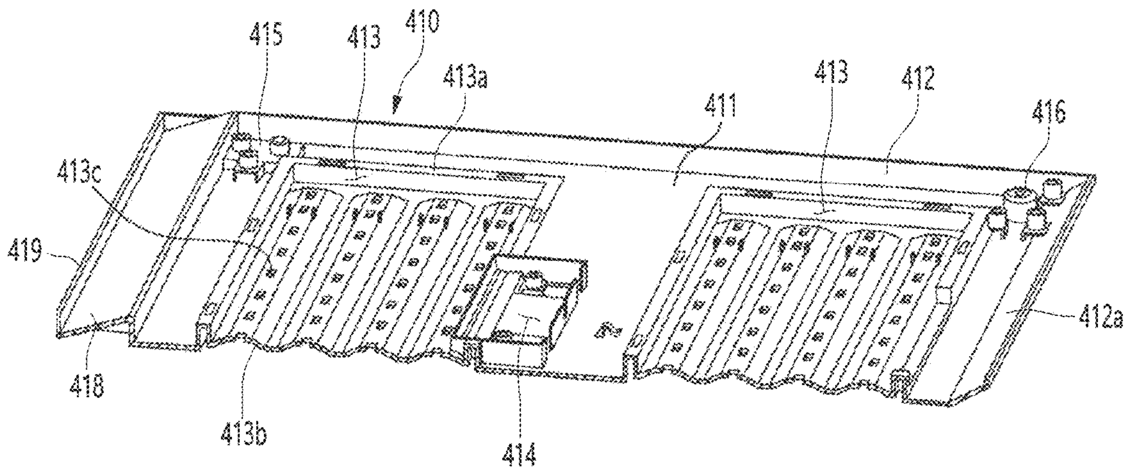
FIG. 12 is a cutaway perspective view illustrating the light case.

FIG. 10 is an exploded perspective view illustrating the light assembly of the apparatus for cultivating plants, FIG. 11 is a perspective view illustrating a light case of the light assembly, and FIG. 12 is a cutaway perspective view illustrating the light case.

As illustrated in the drawing, the light assembly 400 may have a size corresponding to the upper surface of the cultivation space 101 or the bed 300. Therefore, light can be evenly irradiated to the entire area of the bed 300 disposed below.

The light assembly 400 may include a light case 410 which has an open lower surface and in which the LED module 420 can be accommodated, and a cover plate 460 for shielding the opened upper surface of the light case 410.

The light case 410 may include a bottom surface 411 formed in a rectangular plate shape, and a case edge 412 extending upward along the circumference. Meanwhile, the front surface 412*a* of the case edge 412 may be inclined to minimize exposure of the light assembly 400 when the user opens the door 130.

Meanwhile, the rear surface of the light case 410 may include an inclined portion 418 in which the case edge 412 extends rearward and inclines downward toward the rear end.

The light assembly 400 is provided on the lower surface of the bed 300 that can be introduced therein or withdrawn therefrom, and the bed 300 is shaken while the bed 300 is introduced therein or withdrawn therefrom so that the supplied water overflows from the bed 300 and water may infiltrate into the light assembly 400 due to overflow or splashing of water that may occur during the water supply process.

In a case where water falls toward the light assembly 400 by overflowing or splashing water from the water supply portion 310, the water falling from the inclined portion 418 is guided to a position corresponding to the drain member 260 and thus may be accommodated in the drain pan 250.

The inclined portion 418 is positioned vertically above the drain member 260, so that water falling from the inclined portion 418 may be accommodated in the drain member 260.

In detail, the rear end of the inclined portion 418 may be positioned behind the front end of the opened upper surface of the drain member 260. Accordingly, the water discharged from the inclined portion 418 may fall to the drain member 260 and be accommodated in the drain pan 250 in the machine room 200.

In addition, the rear end of the inclined portion 418 may be positioned more rearward than the rear end of the water supply portion 310. Accordingly, water falling from the water supply portion 310 may be discharged to the lower side of the rear end by the inclined portion 418 to prevent penetration into the light assembly 400.

In addition, the rear surface of the light case 410 includes an extension rib 419 extending upward along the rear end of the inclined portion 418.

A drainage portion 419*a* is included in the center of the extension rib 419, so that the falling water is guided toward the rear end of the inclined portion 416 through the inclined portion 418, and may be guided to and discharged from the drainage portion 419*a* through the extension rib 419.

Meanwhile, since the bed 300 is not provided above the light case of the upper light assembly 400*b* mounted on the upper surface of the cultivation space among the light cases 410, the inclined portion 418 may not be provided. In other words, the inclined portion 418 may include a light case 410 in which the inclined portion 418 is formed in both the upper light assembly 400*b* and the lower light assembly 400*a*, but the inclined portion 418 may be provided only in the light case 410 of the lower light assembly 400*a*.

In addition, the inclined portion 418 may be shielded by the blower assembly 500.

In other words, the inclined portion 418 may be positioned more rearward than the front area of the blower assembly 500, and in particular, the inclined portion 418 may be positioned in the space above the blower fan 520, is positioned at the rear of the blower cover 530, and thus can be covered without being interfered by the blower assembly (500).

A module mount 413 may be formed in the front half portion and the rear half portion based on the center of the bottom surface 411 of the light case 410. The module mount 413 is a part on which the LED module 420 is mounted and may be configured to mount a plurality of LED modules 420. When the LED module 420 is configured as one, there is a problem that the entire LED module 420 has to be replaced when an abnormality occurs in the LED module 420, and in a case where the number of the LED modules 420 is too large, there is a problem in that mounting and assembly of the LED modules are difficult and the disposition of electric wires connected to the LED module 420 is not easy. Accordingly, the LED module 420 is composed of two and disposed in the front and rear direction, and a space in which a temperature sensor mount 415 and a residual water detection device mount 414 for disposing a temperature sensor 450 and a residual water detection sensor 440 can be secured between the LED modules 420.

Meanwhile, since the bed 300 is not provided on the upper light assembly 400*b* of the light assembly 400 mounted on the upper surface of the cultivation space, the residual water detection sensor 440 may not be provided. The residual water detection device mount 414 may be formed in both the upper light assembly 400*b* and the lower light assembly 400*a*, but the residual water detection sensor 440 is provided only in the lower light assembly 400*a* and thus can be detected whether there is residual water on the upper bed 300*b*.

The module mount 413 may be defined by a mount edge 413*a*. The mount edge 413*a* protrudes upward along the circumference of the LED module 420, and thus a space in which the LED module 420 is accommodated by the mount edge 413*a* may be formed. The mount edge 413*a* has a protruding shape when viewed from above, and has a recessed shape when viewed from below, so that the light cover 430 to be described below can be mounted thereon.

A light groove 413*b* may be formed inside the module mount 413. The light groove 413*b* is formed along the disposition of the LEDs 422 provided in the LED module 420, extends from the left end to the right end inside the module mount 413, and can be disposed continuously in the front and rear direction.

The light groove 413*b* may have a protruding shape when viewed from above and have a recessed shape when viewed from below. In addition, a plurality of LED holes 413*c* may be formed along the protruding center of the light groove 413. The LED holes 413*c* may be formed at corresponding positions to allow the LEDs 422 to be installed thereon. In addition, both sides of the light groove 413*b* are inclined or rounded around the LED hole 413*c* so that the light irradiated from the LED 422 can be reflected through the light groove 413*b* and irradiated downward. In addition, the inner surface of the light groove 413*b* may be surface-treated or coated to more effectively reflect light.

The LED module 420 may be configured such that a plurality of LEDs 422 are mounted on a substrate 421. The substrate 421 may be formed to have a size corresponding to that of the module mount 413, and thus may be fixed inside the mount edge 413*a*.

In addition, a plurality of the LEDs 422 may be continuously disposed at regular intervals on the substrate 421. In this case, the LED 422 may be disposed at a position corresponding to the LED hole 413*c*. The LED 422 may be configured to have a light quantity (wavelength) similar to sunlight and may be configured to irradiate light of a color capable of promoting photosynthesis of plants.

In addition, a cover sheet 423 may be provided above the LED module 420. The cover sheet 423 is to prevent moisture penetration into the substrate 421 or contamination damage thereof and may be formed in a size capable of completely shielding the substrate 421 from above. The cover sheet 423 may be formed of a dielectric material, and may be formed of an insulating material to prevent heat from penetrating upward during the operation of the LED 422.

Meanwhile, an electric wire guide 417 for guiding electric wires connected to the LED module 420 may be formed inside the light case 410. The electric wire guide 417 is positioned on one of both sides in the left and right direction and may be disposed in the front and rear direction along the space between the module mount 413 and the edge 412. Accordingly, the electric wire connected to the LED module 420 may be guided to the rear end of the light case 410 and may be connected to the connector 124*a* on the rear surface of the cultivation space 101.

In addition, blower assembly mounts 415 in which the blower assembly 500 can be mounted may be formed on both sides of the rear end of the light case 410. The blower assembly mount 415 may be formed by recessing the lower surface of the light case 410 so that the blower brackets 550 provided on both upper sides of the blower assembly 500 can be inserted.

The cover plate 460 may have a size corresponding to the size of the light case 410 and is formed in a plate shape to shield the opened upper surface of the light case 410. Boss holes 462 corresponding to mounting bosses 416 formed at four corners of the light case 410 may be formed in the cover plate 460. In addition, the screw fastened below the mounting boss 416 may pass through the boss hole 462 to be fastened to the surface on which the light assembly 400 is mounted.

In addition, a sensor hole 461 may be formed at a position corresponding to the residual water detection sensor 440 in the cover plate 460. Therefore, the residual water detection device provided with the residual water detection sensor 440 may be exposed upwards of the cover plate 460 and contact the lower surface of the bed 300 disposed above to detect residual water inside the bed 300. Of course, since the bed 300 is not disposed above the uppermost light assembly 400*b* among the light assemblies 400, the residual water detection device and the sensor hole 461 may be omitted.

A plurality of light assemblies 400 may be provided in a case where the cultivation space 101 is partitioned by a multi-stage bed 300. In addition, the uppermost light assembly 400 may be fixedly mounted on the upper surface of the cultivation space 101, and the lower light assembly 400 may be fixedly mounted adjacent to the lower surface of the bed 300 at the lower side of the bed 300. In this case, the screw fastened for mounting the light assembly 400 may be fastened through the mounting boss 416 and the boss hole 462.

Meanwhile, a light cover 430 may be provided on a lower surface of the light case 410. The light cover 430 is mounted on the light case 410 to form a portion of the lower surface of the light case 410, shields the module mount 413 from below, and can be configured to protect the LED 422 disposed therein.

The light cover 430 may be formed of a transparent material to allow light to pass through, and a coating or surface treatment for light diffusion may be added to the light cover 430.

A cover edge 431 bent upward may be formed around the light cover 430, and the cover edge 431 may be inserted into the recessed inside of the mount edge 413*a* to be fixedly mounted.

Figure 13:
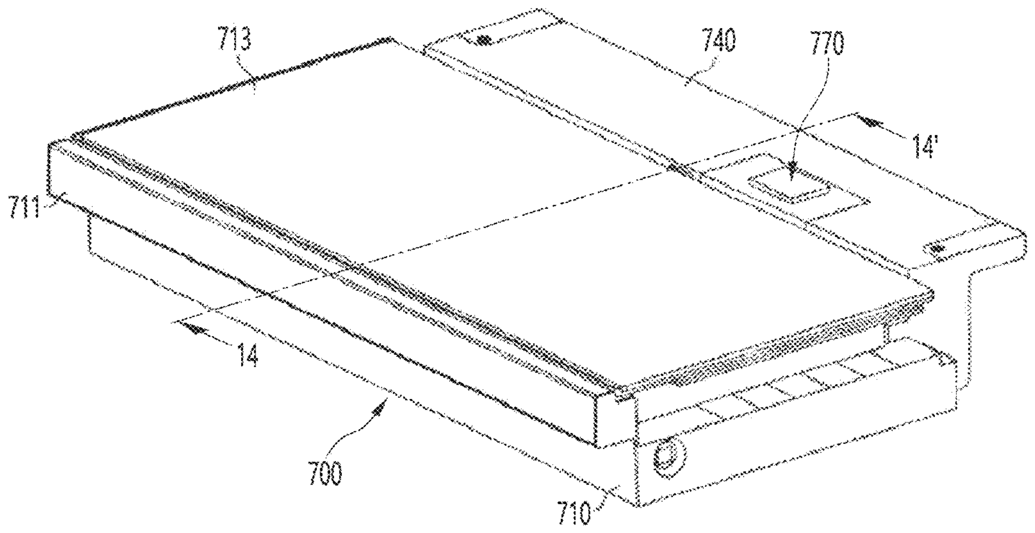
FIG. 13 is a perspective view illustrating a water supply module of the apparatus for cultivating plants.
Figure 14:
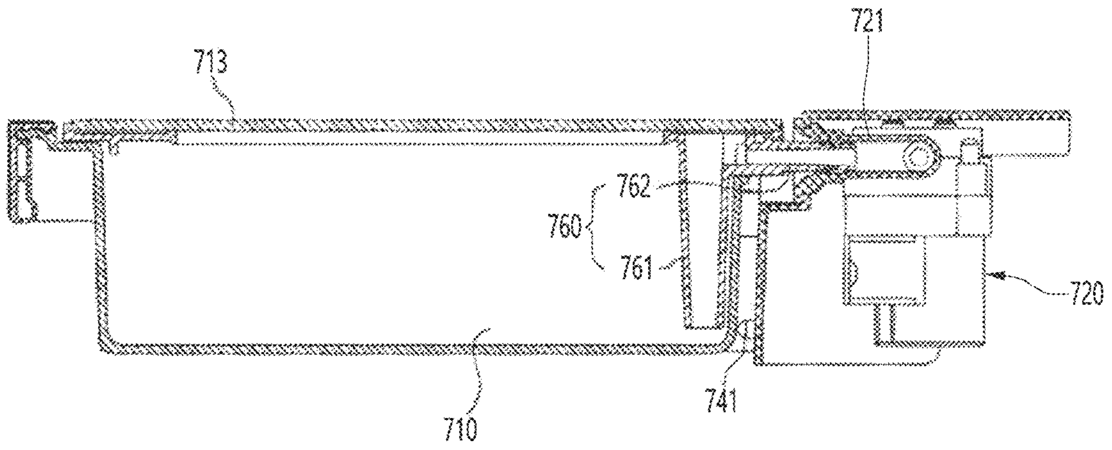
FIG. 14 is a cross-sectional view taken along line 14-14' of FIG. 13.
Figure 15:
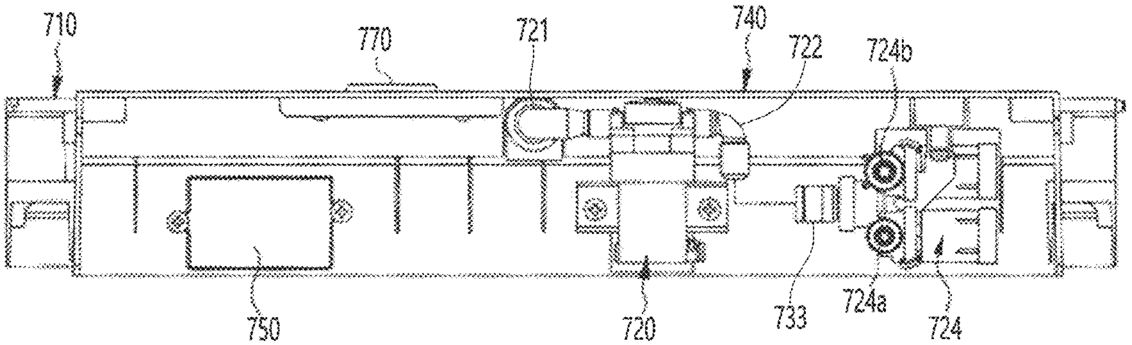
FIG. 15 is a rear view illustrating the pump cover of the water supply module.

FIG. 13 is a perspective view illustrating a water supply module of the apparatus for cultivating plants, FIG. 14 is a cross-sectional view taken along line 14-14' of FIG. 13, and FIG. 15 is a rear view illustrating the pump cover of the water supply module.

As illustrated in the drawing, the water supply module is for supplying water to the pod 10 for cultivation of crops, and the water stored in the apparatus for cultivating plants 1 can be configured to be supplied as much as an appropriate amount at an appropriate time.

In particular, in this embodiment, only water may be supplied through the water supply module, and nutrients may be provided through the pod 10. In other words, various nutrients required for a variety of crops can be provided through the pod 10, and even if different types of pods 10 are provided in one bed 300, nutrients can be provided from each pod. In addition, water may be supplied from the water supply module, and accordingly, constituents other than water are not stored or flow inside the water supply module, so that contamination is prevented and a clean state can be maintained.

The water supply module may include a water tank 700 for storing water for water supply, a water pump 720 for forcibly supplying water from the water tank 700, and a pump cover 740 which forms a mounting space for the water pump 720 and shields the components including the water pump 720. In addition, a water supply valve 724 may be provided on the pump cover 740, and water supply pipes 780*a* and 780*b* for guiding water to the bed 300 may be connected to the water supply valve 724.

In detail, the water tank 700 is formed in a rectangular box shape with an open upper surface so that water supplied to the bed 300 can be accommodated therein. In addition, the water tank 700 may be formed to have a width corresponding to the length of the cultivation space 101 in the horizontal direction and can be formed to fill the space between the bottom surface of the cultivation space 101 and the bottom surface of the bed 300.

A tank cover 713 may be provided on the opened upper surface of the water tank 700. The tank cover 713 is for opening and closing the opened upper surface of the water tank 700, and a rear end thereof may be rotatably coupled to the upper surface of the water tank 700. Accordingly, the user may fill the inside of the water tank 700 with water after opening the tank cover 713.

In addition, tank rails 730 may be provided on both side surfaces of the water tank 700 in the left and right direction. The tank rail 730 is for introduction/withdrawal of the water tank 700 and may have a sliding introduction/withdrawal structure. In addition, one end of the tank rail 730 is fixed to the side surface of the water tank 700, and the other end thereof is fixed to both sides of the inner case 120 to guide the introduction/withdrawal of the water tank 700.

Meanwhile, the water tank 700 may be positioned at a position corresponding to the front surface of the bed 300 in the introduction state. In addition, a tank handle 711 may be provided on the front surface of the water tank 700, and the user may withdraw the water tank 700 by holding the tank handle 711 and pulling the tank handle 711 forward.

The water tank 700 may be withdrawn as much as a distance at which the tank cover 713 may be completely exposed, and in a state where the water tank 700 is withdrawn, the tank cover 713 is opened to be capable of being filled with water in the water tank 700.

A connection pipe 760 may be formed in the water tank 700. The connection pipe 760 may be configured such that water from the water tank 700 is supplied to the water pump 720 in a state where the water tank 700 is introduced. In addition, the connection pipe 760 may be configured to be selectively connected to the pipe connection portion 721 formed on the pump cover 740 according to the introduction/withdrawal of the water tank 700.

In detail, the connection pipe 760 may be provided in the tank cover 713, may be positioned in the center of the tank cover 713 in the left and right direction and may be provided at the rear end. Accordingly, even when the tank cover 713 is rotated for opening and closing, the connection pipe 760 may be configured not to interfere with the water tank 700.

The connecting pipe 760 may include a vertical pipe 761 extending downward from the lower surface of the tank cover 713 and a horizontal pipe 762 extending rearward from the upper end of the vertical pipe 761. The vertical pipe 761 may extend downward from the tank cover 713, wherein the vertical pipe 761 may extend to a position adjacent to the bottom surface of the tank cover 713. Accordingly, the water stored in the tank cover 713 may flow upward along the vertical pipe 761.

In addition, the horizontal pipe 762 may be connected to the upper end of the vertical pipe 761 and may extend rearward. The horizontal pipe 762 may protrude further rearward than the rear surface of the water tank 700 and may extend rearward at a position corresponding to the pipe connection portion 721. The horizontal pipe 762 may be inserted into the pipe connection portion 721 in a state where the water tank 700 is fully introduced, and the water flowing upward through the vertical pipe 761 can be guided to be supplied to the pipe connection portion 721.

The horizontal pipe 762 can be completely separated from the pipe connection portion 721 in a case where the water tank 700 is withdrawn, and even if the tank cover 713 is rotated, the horizontal pipe 762 can be configured not to interfere with the pipe connection portion 721. In addition, when the rear surface of the tank cover 713 corresponding to the horizontal tube 762 is partially recessed and the horizontal tube 762 is rotated together by the rotation of the tank cover 713, the horizontal tube 762 can be prevented from interfering with the rear surface of the tank cover 713.

Meanwhile, a pump cover 740 may be provided at the rear of the water tank 700. Both ends of the pump cover 740 may be coupled to both sides of the cultivation space 101 in the left and right direction, and a front surface and an upper surface may be formed to shield the space behind the water tank 700. The bottom surface of the cultivation space 101 in which the pump cover 740 is provided is formed so that the rear half portion is stepped due to the height of the compressor 610, and the pump cover 740 may be disposed in front of the stepped portion. In addition, the water tank 700 is positioned in front of the pump cover 740. In this case, the upper surface of the water tank 700, the upper surface of the pump cover 740, and the bottom surface of the cultivation space 101 above the compressor 610 may have the same height, and can be shielded by the bed 300.

In addition, the pump cover 740 may include a pipe connection portion 721, a water pump 720, and a water supply valve 724.

In detail, the opened front surface of the pipe connection portion connected to the connection pipe 760 may be exposed on one front side of the pump cover 740. The front surface of the pipe connection portion 721 may be formed at a position corresponding to the rear end of the connection pipe 760. Accordingly, when the water tank 700 is introduced, the rear end of the connection pipe 760 may be inserted into the pipe connection portion 721.

In addition, a water pump 720 may be provided on the rear surface of the pump cover 740. The water pump 720 forces the water of the water tank 700 to flow toward the bed 300, and the inlet of the water pump 720 is connected to the pipe connection portion 721 and the outlet 722 thereof may be connected to a pipe 723 connected to the water supply valve 724.

The water supply valve 724 is opened when the water pump 720 is driven so that water can be supplied toward the bed 300. A plurality of water supply valves 724 may be provided according to the number of beds 300, and one water supply valve 724 may be branched to supply water to each of the plurality of beds 300.

In this embodiment, the input side 733 of the water supply valve 724 is connected to the outlet 722 of the water pump 720 by the pipe 723, and the output side of the water supply valve 724 is branched so that the upper fitting **724*b* and a lower fitting 724*a* may be formed. In addition, an upper water supply pipe 780*b* and a lower water supply pipe 780*a* are connected to the upper fitting 724*b* and the lower fitting 724*a*, respectively, so that a structure through which independent water supply to the upper bed 300*b* and the lower bed 300*a* is possible may be provided. Accordingly, different water supply environments may be created in the upper bed 300*b* and the lower bed 300*a*, and an appropriate amount of water may be supplied to each of the upper bed 300*b* and the lower bed 300*a***.

Accordingly, the connection pipe 760 and the pipe connection portion 721, the water pump 720, the water supply valve 724, and the water supply pipe are sequentially connected, and the water in the water tank 700 by the operation of the water pump 720 may be supplied to the bed 300 through the water pump 720 and the water supply valve 724.

Meanwhile, a water level detection device 750 may be provided on the front surface of the pump cover 740. The water level detection device 750 is for detecting the water level of the water tank 700 and may include a capacitance sensor. In addition, the water level detection device 750 may be formed to protrude forward, and may be configured to be in close contact with the circumferential surface of the water tank 700 in a state where the water tank 700 is introduced. In a case where the water level of the water tank 700 is equal to or lower than the set water level by the water level detection device 750, the controller 190 may output through the display assembly 800 that there is no water in the water tank 700 so that the user can fill the water tank 700 with water.

A tank switch 741 may be provided on the front surface of the pump cover 740. The tank switch 741 may protrude toward the water tank 700 and may be configured to be pressed in contact with the rear surface of the water tank 700 in a state where the water tank 700 is fully introduced.

Accordingly, the tank switch 741 may detect whether a state where the water tank 700 is normally mounted and water supply is possible, and transmit it to the controller. When the mounting signal of the water tank 700 is not input by the tank switch 741, the pump may not be operated. In addition, the non-mounting information of the water tank 700 may be displayed on the display assembly 800 so that the user can recognize it. In addition, by maintaining the water tank 700 in a fully retracted state, the water level detection performance of the water tank 700 through the water level detection device 750 may be guaranteed.

Meanwhile, a residual water detection device 742 may be provided on the upper surface of the pump cover 740. The residual water detection device 742 is for determining whether water supplied to the lower bed 300*a* remains, and in order to distinguish the residual water detection device 742 from the upper residual water detection device provided in the lower light assembly 400*a*, the residual water detection device 742 may be referred to as a lower residual water detection device 742. The upper residual water detection device and the lower residual water detection device 742 may have the same structure with only a difference in their mounting positions.

In other words, the residual water detection device 742 may include a residual water detection sensor 440 capable of detecting moisture. For example, the residual water detection sensor 440 may use a capacitive sensor. The residual water detection device 742 may be configured to accurately detect whether water is present in the bed 300 by protruding upward to bring the residual water detection sensor 440 close to the lower surface of the bed 300. In order to more accurately detect whether the water remains in the bed 300, a detection portion 323 may protrude from the bed 300, and the residual water detection device 742 may have a structure in close contact with the detection portion 323.

Figure 16:
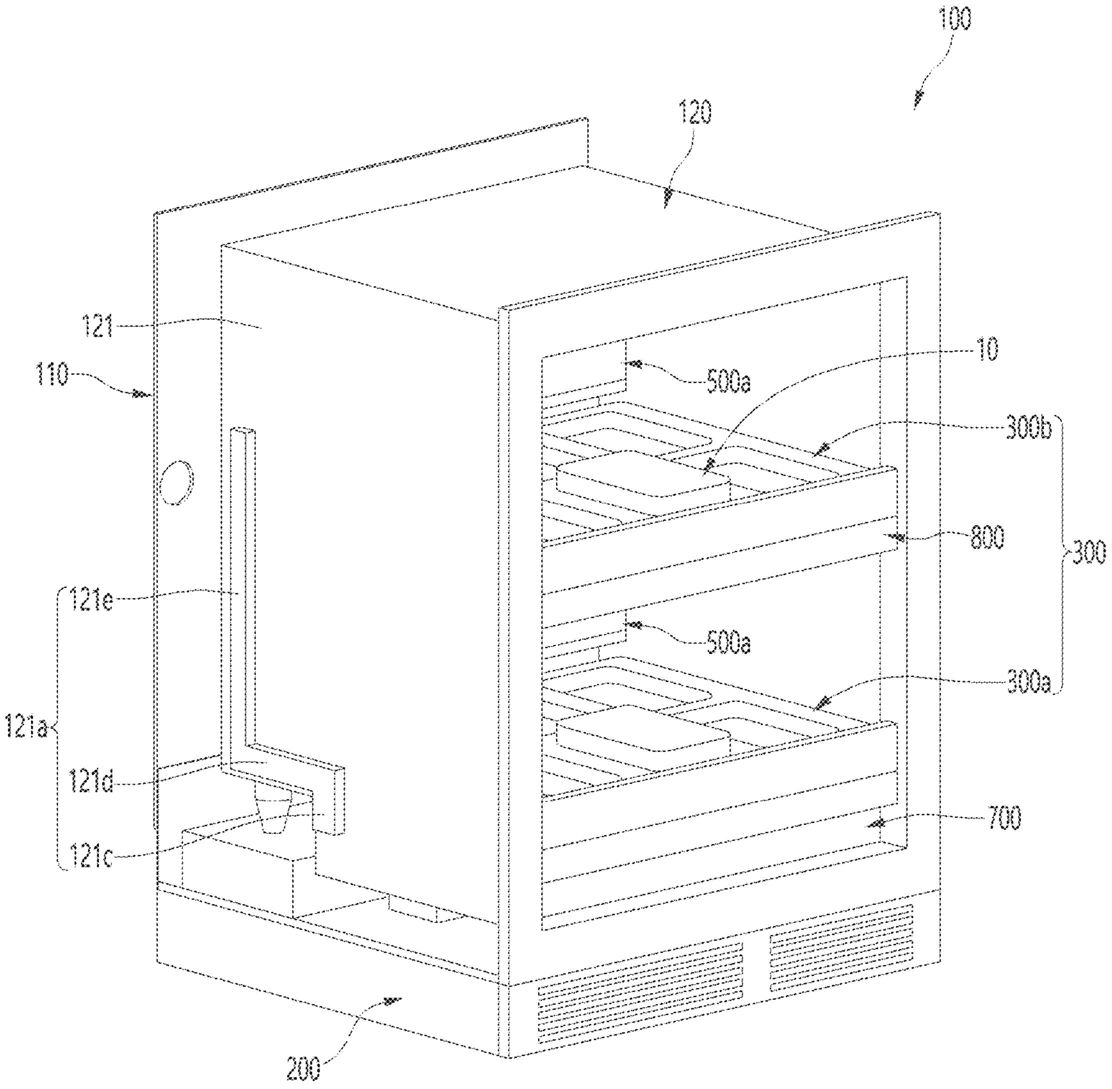
FIG. 16 is a perspective view illustrating a state where a portion of an outer case of the cabinet is removed.
Figure 17:
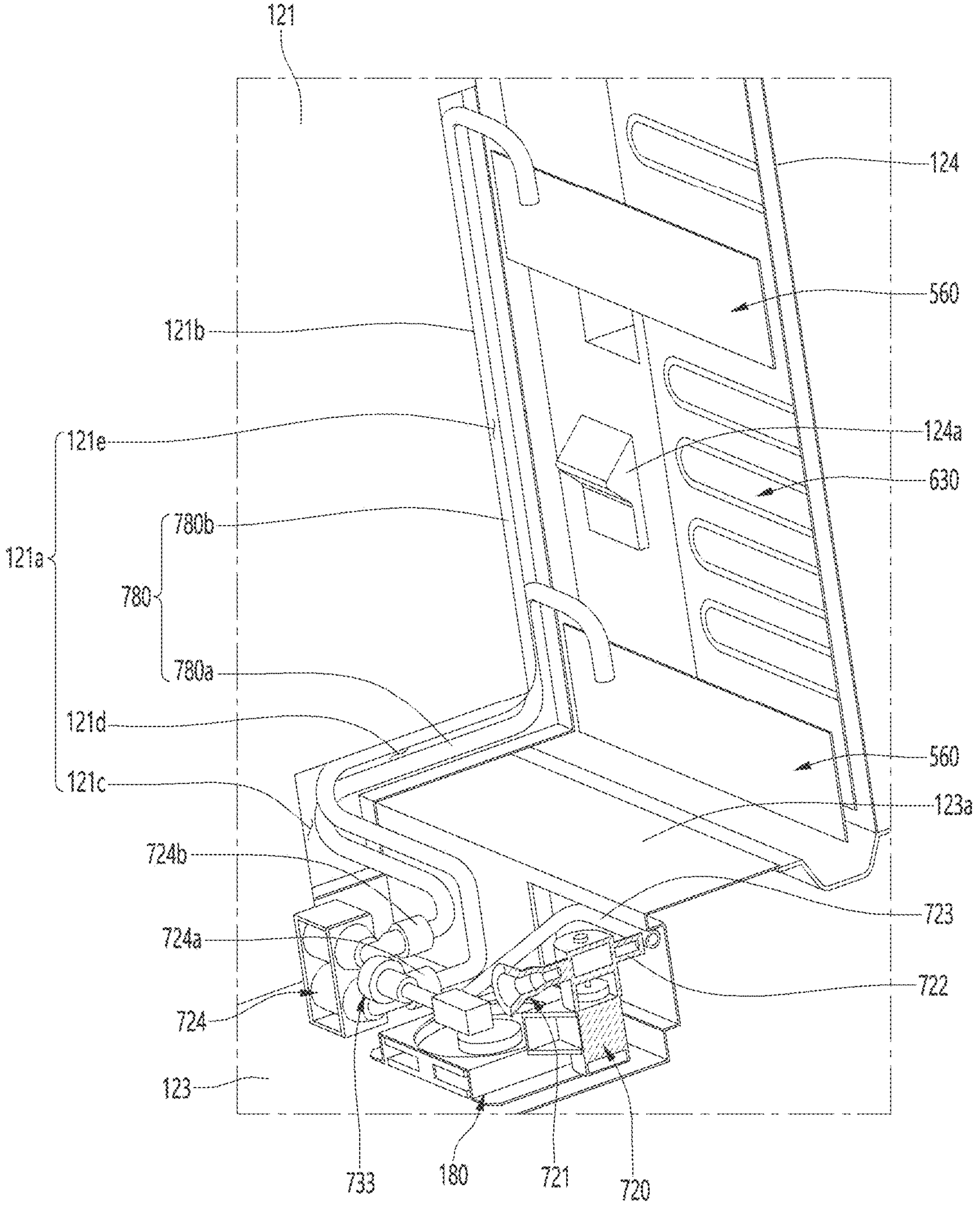
FIG. 17 is a perspective view illustrating a disposition of a water supply flow path of the apparatus for cultivating plants.
Figure 18:
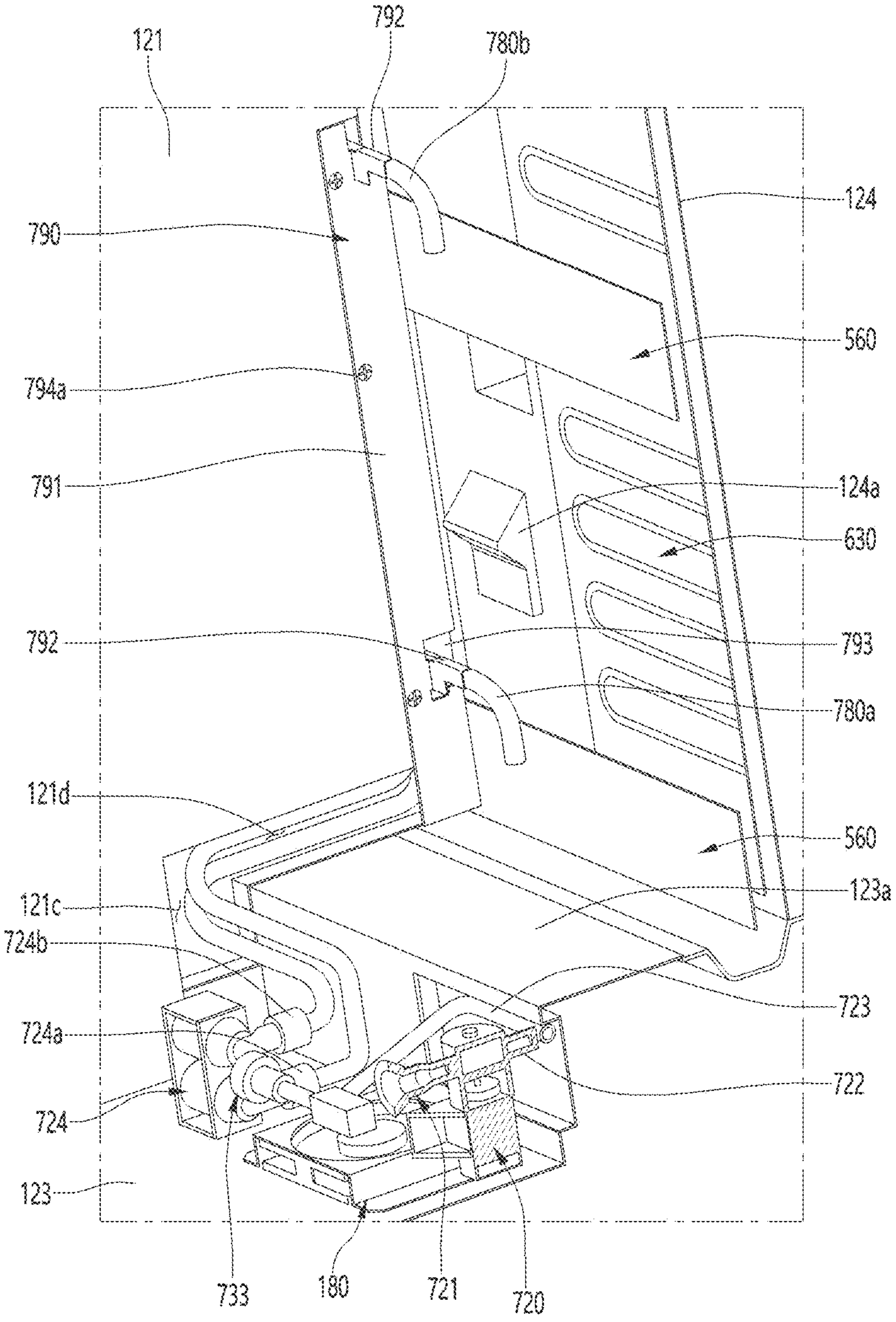
FIG. 18 is a perspective view illustrating a state where the water supply flow path is fixed.

FIG. 16 is a perspective view illustrating a state where a portion of an outer case of the cabinet is removed, FIG. 17 is a perspective view illustrating a disposition of a water supply flow path of the apparatus for cultivating plants, and FIG. 18 is a perspective view illustrating a state where the water supply flow path is fixed.

As illustrated in the drawings, a pipe connection portion 721 and a water pump 720 are connected to each other on the inside of the pump cover 740, and the water pump 720 can be connected to a water supply valve 724 by a pipe 723. In addition, a water supply flow path 780 for supplying water to the bed 300 may be connected to the output side of the water supply valve 724.

When the pump cover 740 is mounted, components for water supply may be shielded. In addition, a discharge fan 180 may be provided under the pump cover 740. The discharge fan 180 allows the air in the cultivation space 101 to be discharged to the outside via the machine room 200. The discharge fan 180 can be shielded by the pump cover 740 to prevent external exposure and is provided on the lower surface of the cultivation space 101 adjacent to the machine room 200 so that exhaust can be more performed smoothly.

When the pump cover 740 is mounted, the water pump 720 and the water supply valve 724 for supplying water and flow paths connected thereto may be shield. The pump cover 740 may shield the lower end of the pipe guide 121*a* recessed in the side surface of the inner case 120. The pipe guide 121*a* may be formed on the side plate 121 forming both side surfaces of the cultivation space 101 of the inner case 120. The pipe guide 121*a* may be formed to be recessed outwardly so that the water supply flow path 780 can be accommodated therein. For example, an opening 121*b* is formed in the side plate 121, and the pipe guide 121*a* formed in a shape corresponding to the outside of the opening 121*b* along the opening 121*b* may be coupled to each other. The inner case 120 may be formed of a metal material, and the pipe guide 121*a* may also be formed of the same material as the inner case 120. In addition, the outer surface of the pipe guide 121*a* may be embedded in the insulating material 102 between the outer case 110 and the inner case 120.

Since the pipe guide 121*a* is recessed from the inside to the outside of the cultivation space 101, interference by components disposed inside the cultivation space 101 may be prevented. In particular, it is possible to have a disposition structure that does not interfere with the beds 300 that are disposed to be capable of being introduced or withdrawn. In addition, it is possible to prevent the volume of the cultivation space 101 from being reduced.

In detail, the pipe guide 121*a* may include a first vertical portion 121*c* extending upward from the space shielded by the pump cover 740, a first horizontal portion 121*d* guided rearward from the first vertical portion 121*c*, and a second vertical portion 121*e* extending upward from the rear end of the first horizontal portion 121*d*.

Meanwhile, the lower surface of the cultivation space 101 may be formed by the lower surface plate 123 of the inner case 120, and a stepped portion 123*a* to prevent interference with the compressor 610 is provided on the rear end of the lower surface plate 123. In addition, the first vertical portion 121*c* and the first horizontal portion 121*d* extend along the front and upper surfaces of the stepped portion 123*a*, and the second vertical portion 121 may be formed to extend upward along the rear surface of the cultivation space 101.

The first vertical portion 121*c* communicates with the space shielded by the pump cover 740 and may serve as a passage into which the water supply flow path 780 connected to the water supply valve 724 may flow. In addition, the first horizontal portion 121*d* may be positioned on the side of the lower bed 300*a* mounted in the cultivation space 101 and may be covered by the lower bed 300*a* so as not to be exposed to the outside.

The second vertical portion 121*e* may extend upward along the rear end of the side plate 121 and may extend slightly higher than the upper end of the upper bed 300*b* and thus water can be supplied to the upper bed 300*b* through the water supply flow path 780.

In addition, the second vertical portion 121 may be disposed on the side of the blower assembly 500 and may be configured to be covered by the blower assembly 500. In addition, a guide cover 790 may be further provided on the second vertical portion 121*e* to shield the second vertical portion 121*e*. The guide cover 790 may be formed in a plate shape to shield the second vertical portion 121*e* and also fix the upper water supply pipe 780*b* and the lower water supply pipe 780*a* to maintain a set position.

Hereinafter, the fixing structure of the water supply flow path 780 by the guide cover 790 will be described in more detail with reference to the drawings.

Figure 19:
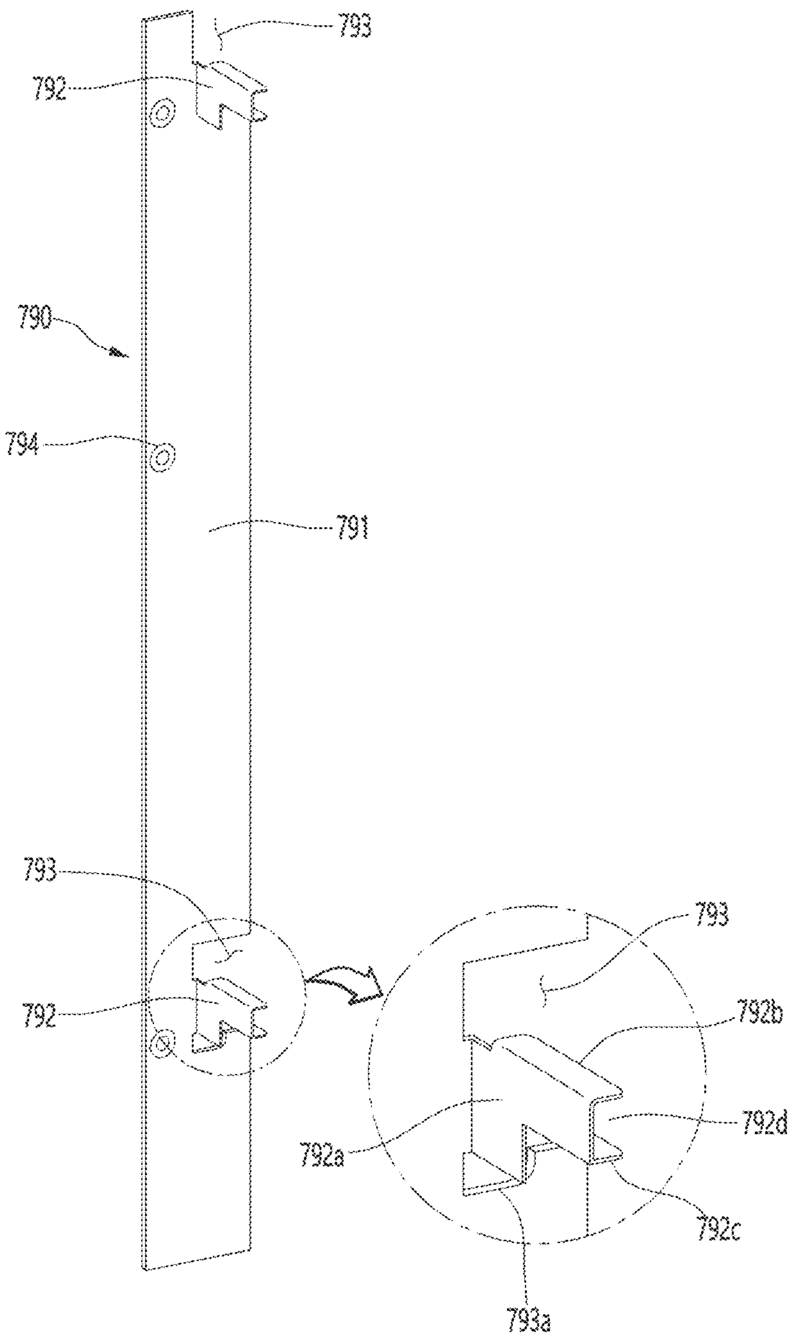
FIG. 19 is a perspective view illustrating a guide cover for fixing the water supply flow path.
Figure 20:
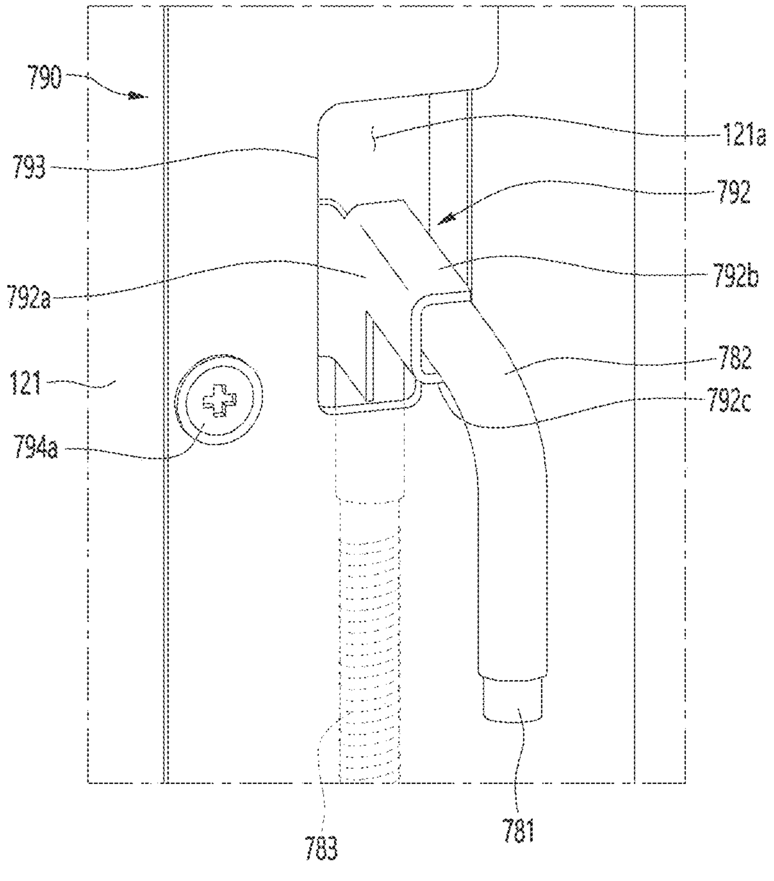
FIG. 20 is a partial perspective view illustrating a state where the water supply flow path is fixed to the guide cover, as viewed from the front.
Figure 21:
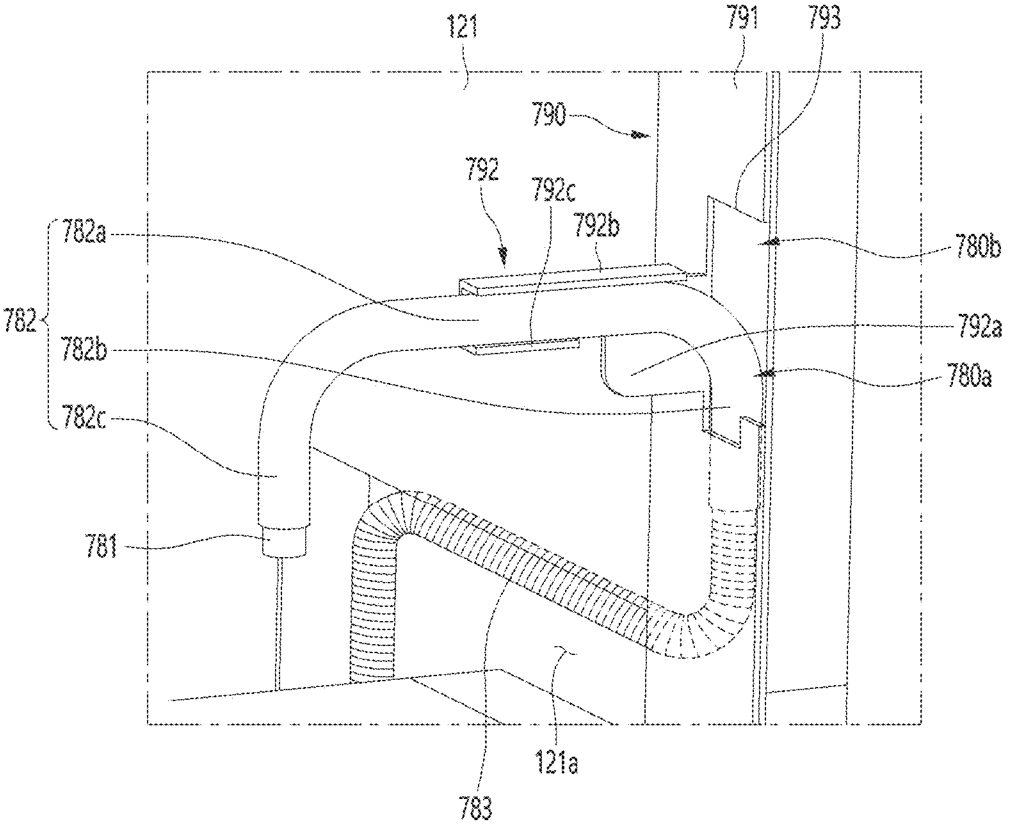
FIG. 21 is a partial perspective view illustrating a state where the water supply flow path is fixed to the guide cover, as viewed from the rear.

FIG. 19 is a perspective view illustrating a guide cover for fixing the water supply flow path, FIG. 20 is a partial perspective view illustrating a state where the water supply flow path is fixed to the guide cover, as viewed from the front, and FIG. 21 is a partial perspective view illustrating a state where the water supply flow path is fixed to the guide cover, as viewed from the rear.

As illustrated, the guide cover 790 may be formed in a plate shape. The guide cover 790 may be formed of a metal material and may be formed of the same material as the inner case 120.

The guide cover 790 may be formed to shield the pipe guide 121*a*. The guide cover 790 may be formed to shield the entire pipe guide 121*a* or may be formed to shield only a portion of the entire pipe guide 121*a* exposed to the outside.

For example, the guide cover 790 may be formed to shield the second vertical portion 121$c$. In other words, the guide cover 790 may extend from the lower end to the upper end of the second vertical portion 121$e$ and extend from the rear end of the side plate 121 to the end portion of the second vertical portion 121$e$ to shield the second vertical portion 121$c$.

In addition, a plurality of screw holes 794 may be formed along the longitudinal direction of the guide cover 790. A screw 794$a$ may be fastened to the side plate 121 through the screw hole 794 and the guide cover 790 can be fixedly mounted on the side plate 121 in a state of shielding the second vertical portion 121$e$.

Meanwhile, a cutout 793 may be formed in the guide cover 790. The cutout 793 may be formed above the water supply portion 310 formed in the upper bed 300$b$ and the lower bed 300$a$. The cutout 793 may be formed at one end of the guide cover 790. In addition, a water supply pipe mount 792 for fixing the water supply pipes 780$a$ and 780$b$ may be formed inside the cutout 793.

The shape of the cutout 793 disposed above and below and the shape of the water supply pipe mount 792 may have the same structure with only a difference in position. In addition, the number of the cutout 793 and the water supply pipe mount 792 may be formed to correspond to the number of the bed 300. Accordingly, the cutout 793 and the water supply pipe mount 792 will be described using the same reference numerals.

The water supply pipe mount 792 may be bent in a direction perpendicular to the side plate 121 at the inner end portion of the cutout 793. In this case, the end portion of the water supply pipe mount 792 may be at a position corresponding to the vertical upper side of the water supply portion 310.

The water supply pipe mount 792 may be formed in a shape capable of fixing the upper water pipe 780$b$ or the lower water supply pipe 780$a$ by cutting one end of the guide cover 790 formed in a plate shape to form a cutout 793, and then bending the inside of the cutout 793 a number of times. Therefore, it is possible to simply provide a structure for fixing the water supply pipe only with the plate-shaped guide cover 790 without adding or coupling a separate configuration.

In detail, the water supply pipe mount 792 may include a bent portion 792$a$ extending from the cutout 793, an upper fixing portion 792$b$ bent from an upper end of the bent portion 792$a$ and a lower fixing portion 792$c$ bent from an lower end of the bent portion 792$a$.

The bent portion 792$a$ may have a thickness smaller than the vertical length of the cutout 793 and greater than the diameter of the water supply pipes 780$a$ and 780$b$. Preferably, the bent portion 792$a$ may be formed to have a width equal to or more than twice the diameter of the water supply pipes 780$a$ and 780$b$. In addition, the bent portion 792 may be formed so that the extended end portion is positioned in a region between one end portion and the center portion in the horizontal direction of the water supply portion 310.

In addition, the upper fixing portion 792$b$ may be bent backward along the upper end of the bent portion 792$a$. The upper bent portion 792$a$ may be formed to be equal to or slightly larger than the diameter of the water supply pipes 780$a$ and 780$b$ and is formed to contact the upper ends of the water supply pipes 780$a$ and 780$b$.

In addition, the lower fixing portion 792$c$ may be bent backward along the lower end of the bent portion 792$a$. The lower bent portion 792$a$ may be disposed parallel to the upper bent portion 792$a$ and may have the same width as the upper bent portion 792$a$. In addition, the lower fixing portion 792$c$ may be formed to contact the lower ends of the water supply pipes 780$a$ and 780$b$.

The extended end portion of the lower fixing portion 792$c$ may be formed to extend to the same position as the upper fixing portion 792$b$. In addition, the lower fixing portion 792$c$ may have a shorter length than the upper fixing portion 792$b$. In other words, the bent portion 792$a$ may have a narrower width at the position where the lower fixing portion 792$c$ is formed than at the position adjacent to the end portion of the cutout 793. Accordingly, the bent portion 792$a$ is firmly fixed to the end portion of the cutout and can be prevented from being easily deformed by an external force, thereby allowing the water supply pipes 780$a$ and 780$b$ to maintain a predetermined position.

In addition, an interval between the end portions of the upper fixing portion 792$b$ and the lower fixing portion 792$c$ may be the same as or slightly smaller than the diameter of the water supply pipes 780$a$ and 780$b$. Accordingly, the water supply pipes 780$a$ and 780$b$ may be press-fitted between the upper fixing portion 792$b$ and the lower fixing portion 792$c$ and are fixed to the water supply pipe mount 792 not to deviate from the mounting position or not to be easily detached from the water supply pipe mount 792.

A guide groove 793$a$ further recessed at a position where the water supply pipes 780$a$ and 780$b$ is disposed may be further formed at the lower end of the cutout 793. The guide grooves 793$a$ may be formed to correspond to the diameters of the water supply pipes 780$a$ and 780$b$, and thus the water supply pipes 780$a$ and 780$b$ passing through the cutout 793 in the vertical direction can be guided to be positioned on the inside of the guide grooves 793$a$. Accordingly, the water supply pipes 780$a$ and 780$b$ extending in the vertical direction may be aligned to a predetermined position and may be more easily inserted into the water supply pipe mount 792.

Meanwhile, the water supply pipe 781 may be formed of a flexible resin tube. In addition, a coil member 783 may be provided on the outer surface of the water supply pipe 781. The coil member 783 is formed of a metal wire material and may have a spring-like structure. The water supply pipe 781 may be disposed to pass through the coil member 783. Accordingly, the water supply pipe 71 may maintain a state of being disposed along the pipe guide 121$a$ due to the shape of the coil member 783.

In other words, the shape of the water supply pipe 781 may be maintained depending on the shape in which the coil member 783 is bent, and thus the water supply pipe 781 may maintain the bent shape inside the pipe guide 121$a$. In addition, since the water supply pipe 781 can be bent along the bent path of the coil member 783, it is prevented the water supply pipe 781 from being partially folded or a portion in which the inner diameter thereof is sharply narrowed from occurring. and water supply through the water supply pipe can also be made to occur smoothly. The coil member 783 may be disposed only in a local region where the water supply pipe 781 is bent or may be disposed in a region of the water supply pipe 781 disposed inside the pipe guide 121$a$.

In addition, a sleeve 782 may be formed at an end portion of the water supply pipe 781. The sleeve 782 may be formed in a metal tube shape and may be formed from the inside of the pipe guide 121$a$ to an end portion of the water supply pipe 781. The sleeve 782 may cover at least the water supply pipe 781 exposed to the inside of the cultivation space 101. Accordingly, the sleeve 782 allows the end portion of the water supply pipe 781 to maintain a predetermined position, and it is possible to prevent overflow of water during the water supply process by accurately supplying water to the region of the water supply portion 310 at all times.

In addition, the sleeve 782 may allow the water supply pipe 781 to have a more improved outer appearance, and it can prevent water supply pipe 1 from being damaged while the water supply pipe 781 is mounted to the water supply pipe mount 792. This can be prevented, as well as being press-fitted into the water supply pipe mount 792 to be firmly fixed. In addition, even if the pod 10 is mounted inside the cultivation space 101 or collides with the water supply pipes 782*a* and 780*b* during a service process such as cleaning, it is possible to prevent the water supply pipes 780*a* and 780*b* from being deformed.

Meanwhile, the sleeve 782 may include a sleeve extension portion 782*a* fixed to the water supply pipe mount 792 and extending perpendicular to the side plate 121, an inner bending portion 782*b* bent downward from one end of the sleeve extension portion 782*a* and that is inserted into the cutout 793, and an outer bending portion 782*c* that is bent downward from the other end of the sleeve extension 782*a* and faces the water supply portion 310.

The inner bending portion 782*b* and the outer bending portion 782*c* may extend downward to have the same length and may extend in parallel with the side plate 121. The inner bending portion 782*b* may extend to be positioned inside the guide groove 793*a*. In addition, the outer bending portion 782*c* may be positioned vertically above the water supply portion 310, and the end portion of the water supply pipe 781 may be formed to more protrude from the end portion of the outer bending portion 782*c*. Accordingly, it is possible to prevent the water discharged through the water supply pipe 781 from forming on the outer bending portion 782*c*.

Meanwhile, the water supply pipe mount 792 is disposed above and below the upper bed 300*b* and the lower bed 300*a*, respectively, and the upper water supply pipe 780*b* and the lower water supply pipe 780*a* are mounted on each of the water supply pipe mount 792 so that independent water supply is possible to the upper bed 300*b* and the lower bed 300*a*.

Figure 22:
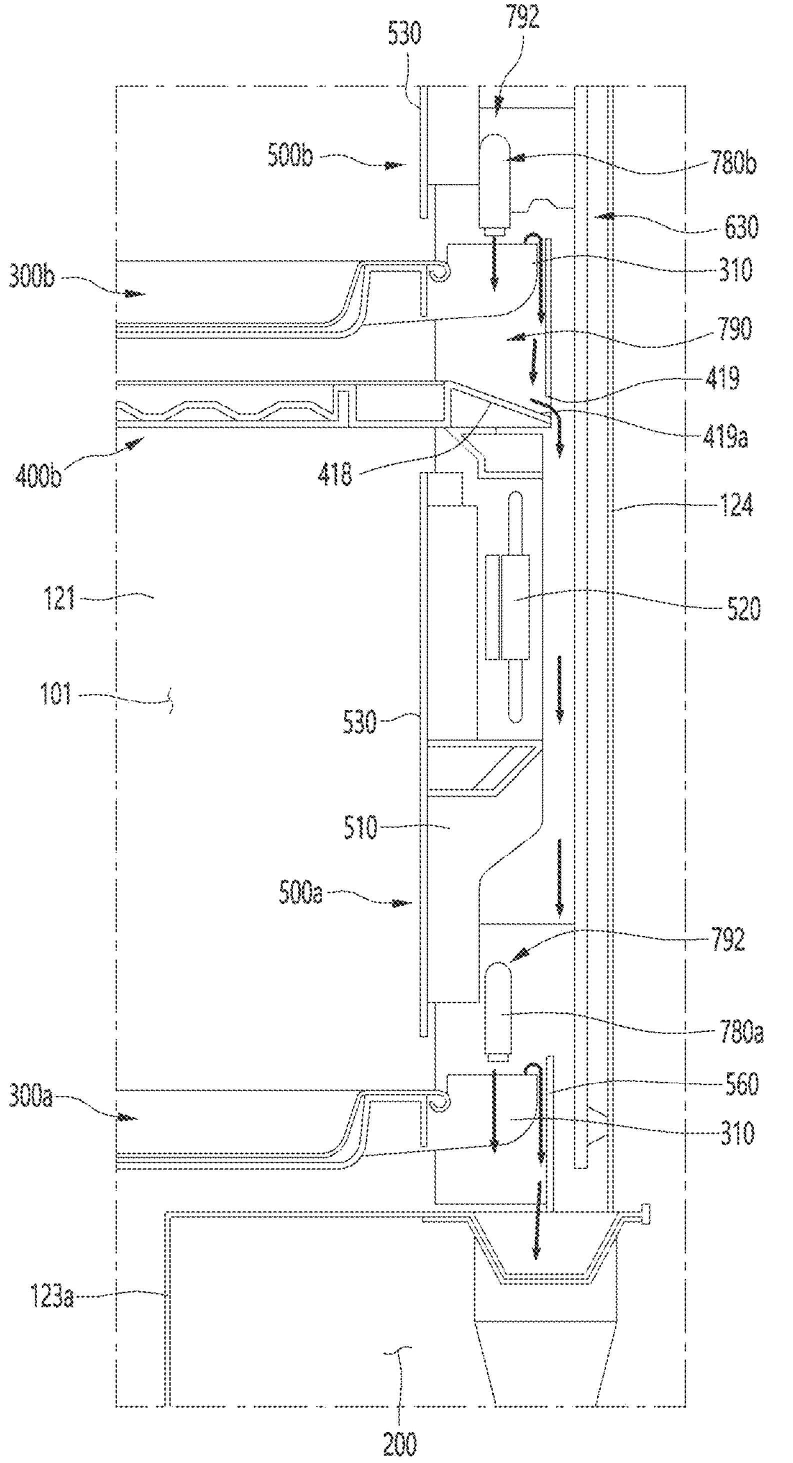
FIG. 22 is an enlarged view illustrating part “B” of FIG. 5.

FIG. 22 is an enlarged view illustrating part "B" of FIG. 5.

With reference to the drawings, considering in more detail with respect to the disposition of the water supply pipe, the upper water supply pipe 780*b* and the lower water supply pipe 780*a* respectively connected to the water supply valve 724 may be disposed along the pipe guide 121*a*. The upper water supply pipe 780*b* may extend above the upper bed 300*b*, and the lower water supply pipe 780*a* may extend above the lower bed 300*a*. The upper water supply pipe 780*b* and the lower water supply pipe 780*a* are independently disposed, and water necessary for plant growth can be independently supplied to the upper bed 300*b* and the lower bed 300*a*.

In addition, the upper water supply pipe 780*b* and the lower water supply pipe 780*a* can be guided to the rear wall surface of the cultivation space 101, that is, to the position of the rear plate 124 along the pipe guide 121*a* recessed in the side wall of the cultivation space 101.

The upper water supply pipe 780*b* and the lower water supply pipe 780*a* are positioned at the corner regions of the rear surface and the side surface of the cultivation space 101. Accordingly, the upper water supply pipe 780*b* and the lower water supply pipe 780*a* may extend upward in a corner region where the rear plate 124 and the side plate 121 are adjacent to each other. In other words, the water supply pipes 780*a* and 780*b* are guided along the inner side of the cultivation space 101 to facilitate disposition, and extend upward along the corner area of the cultivation space 101 to minimize interference with internal components.

In particular, the water supply pipes 780*a* and 780*b* are disposed at a position separated to the side of the evaporator so as not to interfere with the evaporator 630 mounted on the front surface of the rear plate 124 so that the water flowing along the water supply pipes 780*a* and 780*b* will prevent freezing or excessive temperature drop by the cold air of the evaporator. In addition, a structure that prevents interference with the internal components of the cabinet 100 such as the evaporator 630 has and facilitates disposition operation is provided.

The upper water supply pipe 780*b* and the lower water supply pipe 780*a* have a structure which extends upward to pass the water supply portion 310 of the upper bed 300*b* and the lower bed 300*a*, respectively, and then is bent toward the water supply portion 310 again. In this case, the positions of the upper water supply pipe 780*b* and the lower water supply pipe 780*a* may be fixed by the water supply pipe mount 792 formed on the guide cover 790, respectively.

In other words, the upper water supply pipe 780*b* and the lower water supply pipe 780*a* are configured to extend from above the bed 300 to the inside of the cultivation space 101 so that the upper water supply pipe 780*b* and the lower water supply pipe 780*a* do not interfere at all even when the bed 300 is introduced thereinto or withdrawn therefrom. In addition, in a state where the bed 300 is fully introduced thereinto, the outlets of the upper water supply pipe 780*b* and the lower water supply pipe 780*a* are positioned in the center portion of the water supply portion 310, so that water supply to the upper bed 300*b* and the lower bed 300*b* can be smoothly performed.

Meanwhile, a portion of the recessed space of the pipe guide 121*a* may be shielded by the guide cover 790. In addition, the guide cover 790 as well as the upper water supply pipe 780*b* and the lower water supply pipe 780*a* exposed to the inside of the refrigerator may be shielded by the blower assembly 500.

In other words, the water supply portion 310 may be positioned further back than the front area of the blower assembly 500, and in particular, the portions of the upper water supply pipe 780*b* and the lower water supply pipe 780*a* protruding into the cultivation space 101 may also be positioned further rearward. In particular, the protruding parts of the upper water supply pipe 780*b* and the lower water supply pipe 780*a* may be positioned in the space below the fan guide 510, and are positioned behind the blower cover 530 to be capable of being covered without being interfered by the blower assembly 500.

Due to this structure, when the user opens the door 130 and looks at the cultivation space 101, the end portion of the upper water supply pipe 780*b* and the end portion of the lower water supply pipe 780*a*, which supplies water to the upper bed 300*b* and the lower bed 300*a* are possible to prevent from being exposed to the outside. Accordingly, the inside of the cultivation space 101 can be seen more clearly, and a cleaner image can be provided.

Hereinafter, the structure of the bed 300 will be described in more detail with reference to the drawings. Even if a plurality of the beds 300 are provided, only one bed 300 will be described because a plurality of the beds 300 all have the same structure except for a different mounting position.

Figure 23:
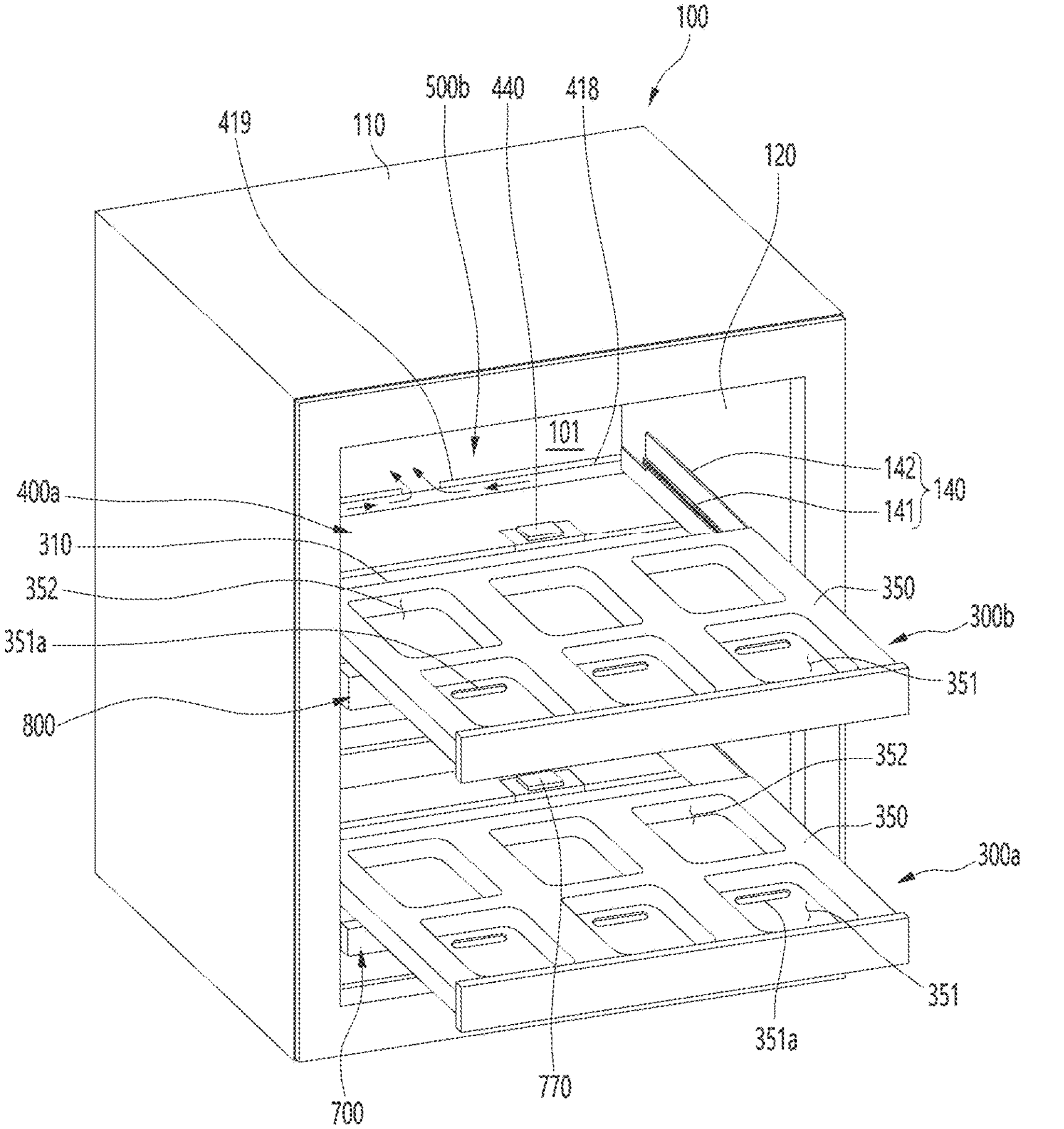
FIG. 23 is a perspective view illustrating a state where the bed of the apparatus for cultivating plants is withdrawn.
Figure 24:
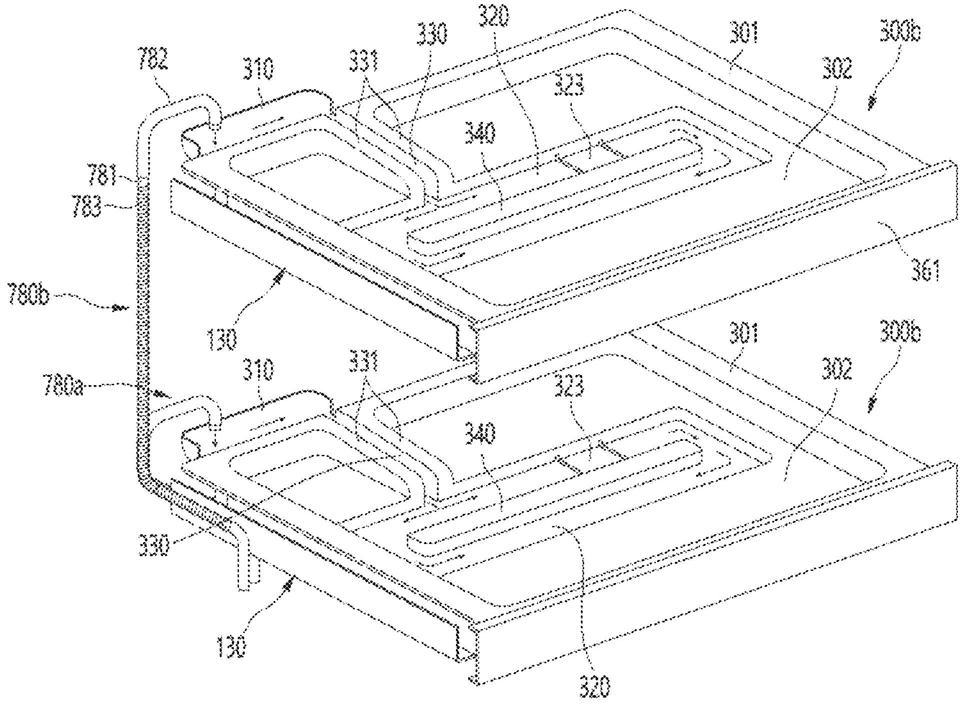
FIG. 24 is a perspective view illustrating a disposition relationship between the bed and the water supply flow path.
Figure 25:
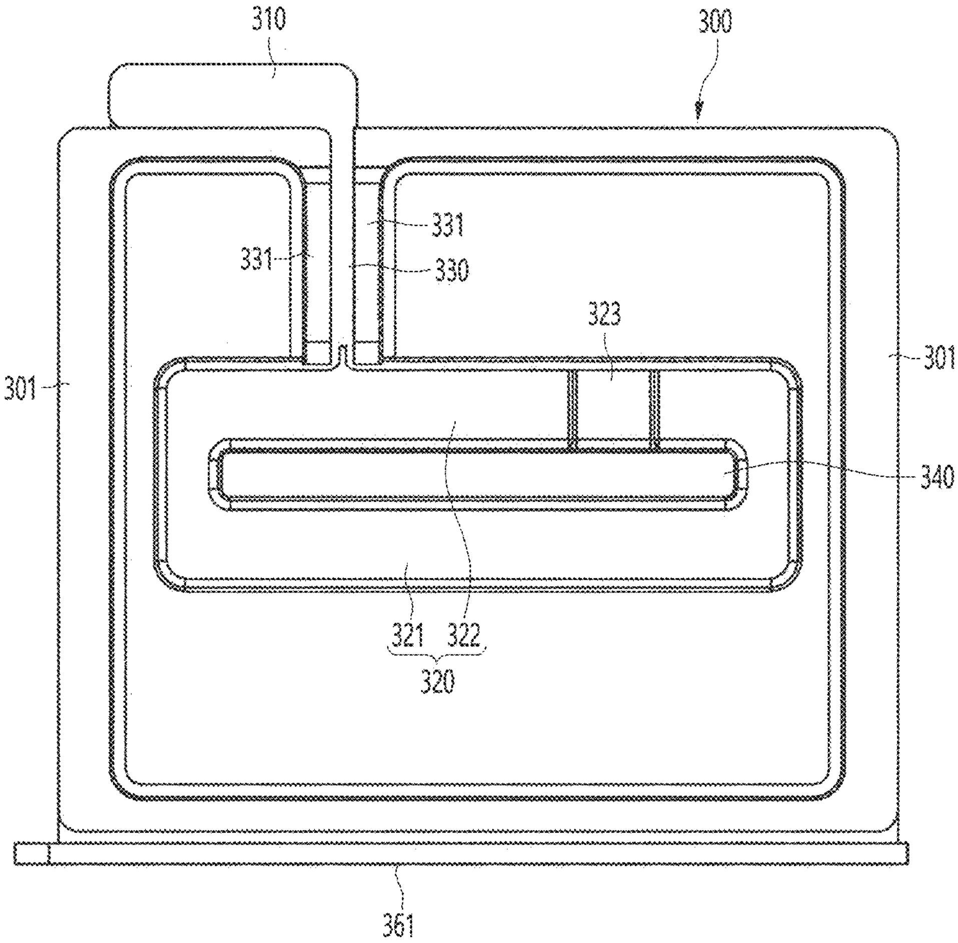
FIG. 25 is a plan view illustrating the bed.
Figure 26:
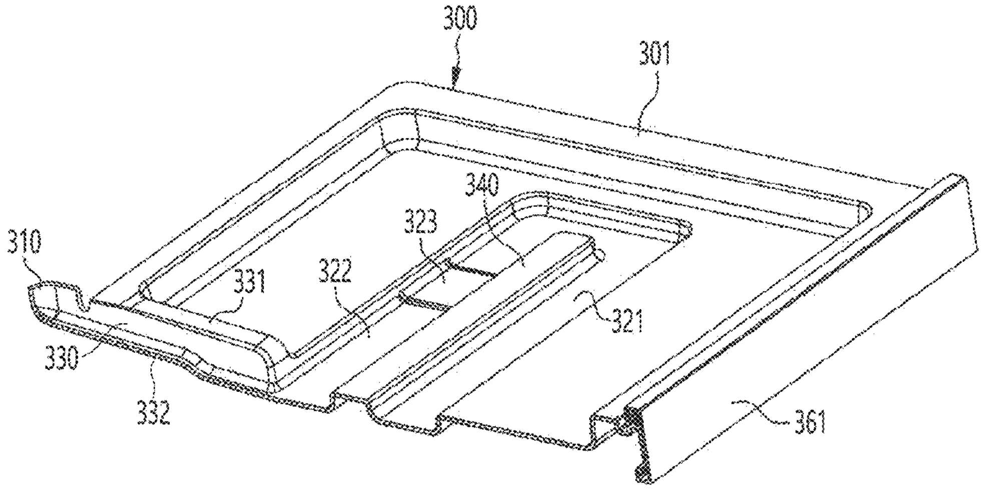
FIG. 26 is a cut-away perspective view illustrating the bed.
Figure 27:
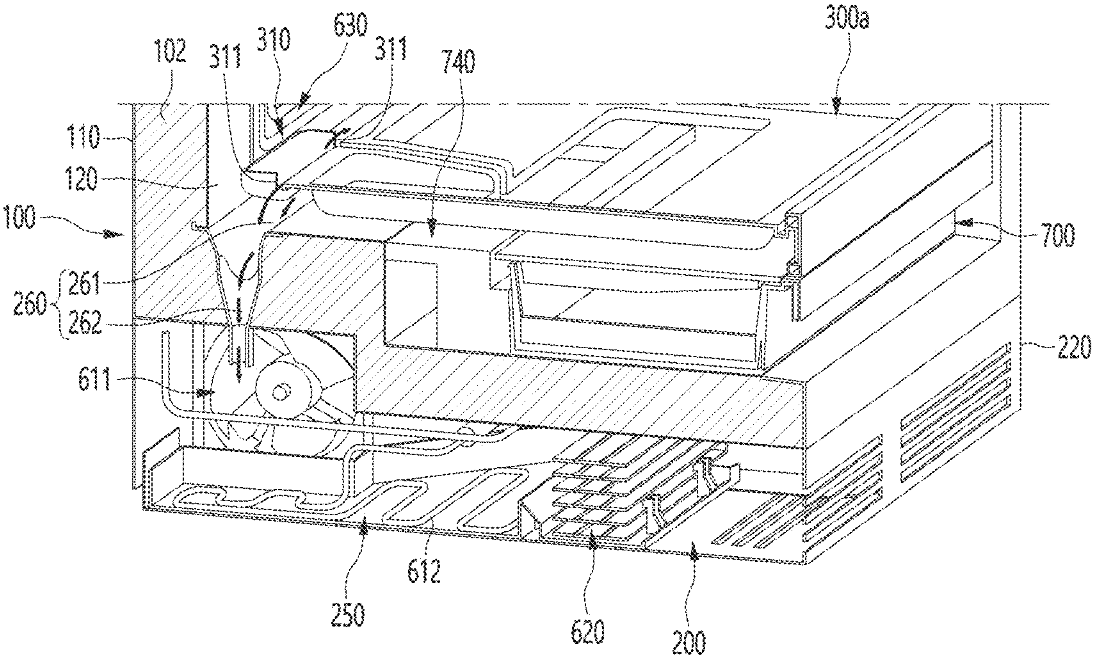
FIG. 27 is a perspective view illustrating a lower structure of the apparatus for cultivating plants.
Figure 28:
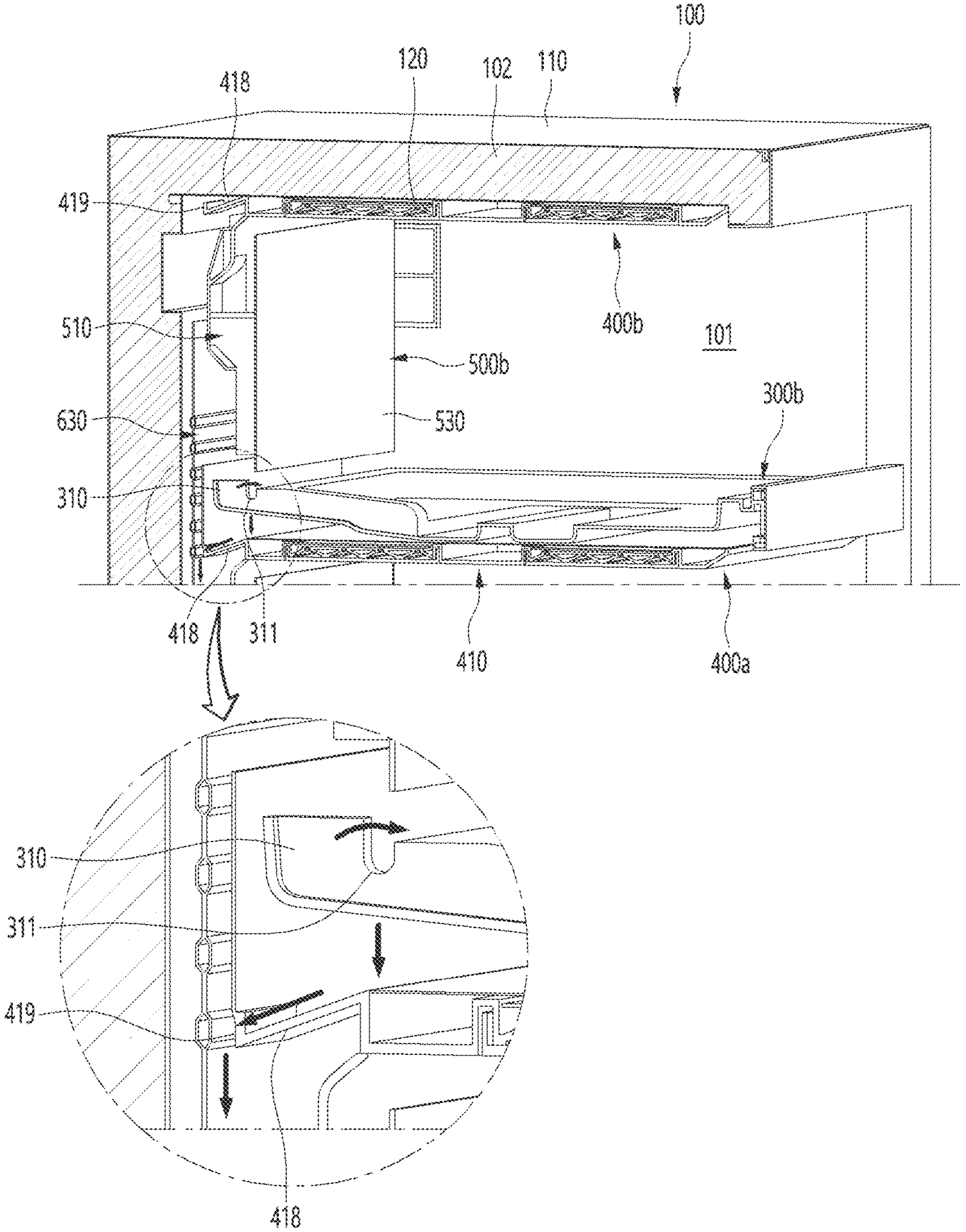
FIG. 28 is a perspective view illustrating an upper structure of the apparatus for cultivating plants.

FIG. 23 is a perspective view illustrating a state where the bed of the apparatus for cultivating plants is withdrawn, FIG. 24 is a perspective view illustrating a disposition relationship between the bed and the water supply flow path, FIG. 25 is a plan view illustrating the bed, FIG. 26 is a cut-away perspective view illustrating the bed, FIG. 27 is a perspective view illustrating a lower structure of the apparatus for cultivating plants, and FIG. 28 is a perspective view illustrating an upper structure of the apparatus for cultivating plants.

As illustrated in the drawings, the bed 300 may be formed in a rectangular plate shape that partitions the cultivation space 101, and can be mounted to be introduced into/withdrawn from the cultivation space by the bed rail device 140 mounted on both sides of the cultivation space 101.

The bed rail device 140 may include a slidably extending bed rail 142 and a rail bracket 141 capable of fixing the bed rail 142 to both sides of the cultivation space 101. The bed rail 142 may have a structure extending in multiple stages and may connect between both side surfaces of the bed 300 in the left and right direction and the rail bracket 141.

The bed 300 may form a structure which is formed in a rectangular shape as a whole to provide a space in which a plurality of pods 10 are disposed and in which water supplied can be stored. In addition, the bed 300 may be formed of a plastic material to form a structure for guiding the flow of supplied water.

A bed flange 301 extending outwardly is formed around the bed 300. A bed tray 350 to be described below may be seated on the bed flange 301. In addition, the inner area of the bed flange 301 becomes an area in which the pod 10 can be disposed.

A recessed portion 302 is formed inside the bed flange 301, and the bed tray 350 may be seated in the recessed portion 302. The recessed portion 302 may be formed to accommodate the entire plurality of pod seating portions 352 formed in the bed tray 350. In addition, when the bed tray 350 is mounted, the upper surface of the bed 300 and the lower surface of the bed tray 350 may be in contact with each other and overlapped.

A water supply portion 310 may be formed at the rear end of the bed 300. The water supply portion 310 may be positioned at one end of both sides in the left and right direction and may be formed to protrude rearward from the rear end of the bed 300. In other words, the water supply portion 310 may be positioned vertically below the end portions of the water supply pipes 780*a* and 780*b* protruding from the side surface of the cultivation space 101.

The water supply pipes 780*a* and 780*b* and the water supply portion 310 are installed in a state of being spaced apart from each other so as not to interfere with the introduction or withdrawal of the bed 300, so that while water falls from the water supply pipes 780*a* and 780*b* to the water supply portion 310, there is a possibility that water splashing occurs and the water falling from the water supply pipes 780*a* and 780*b* overflow and thus excessively flows into the bed 300 through the water supply portion 310 to overflow.

In particular, when water splashes or overflows from the water supply portion 310 and water penetrates into the light assembly 400 or the display assembly 800, product damage is caused.

Accordingly, in this embodiment, the water supply portion 310 and the water supply pipe ends 780*a* and 780*b* are disposed vertically upward from the opened upper surface of the drain member 260, and the water falling from the water supply portion 310 may be accommodated in the drain member 260 and stored in the drain pan 250.

The water supply portion 310 may be formed in a shape in which an upper surface is opened and a lower surface is recessed. The circumference of the water supply portion 310 protrudes to a predetermined height to prevent water supplied from the water supply pipes 780*a* and 780*b* from splashing or overflowing.

In addition, both sides of the water supply portion 310 may further include an open water supply portion groove 311. When the water supplied from the water supply pipes 780*a* and 780*b* splashes or overflows, the water supply portion groove 311 guides the water so that the water does not excessively flow into the bed 300, flows out from the water supply portion 310 through the water supply portion groove 311, and is guided to be discharged to the drain member 260.

Even in a case where the water supply portion groove 311 is formed at the front end of the circumference of the water supply portion 310 and thus water flows backward from the water collection portion 320, the water may be discharged into the water supply portion groove 311.

In addition, the lower end of the water supply portion groove 311 is positioned below the rear end of the bed 300 so that the water does not flow into the bed 300 in a process in which the water is discharged through the water supply portion groove 311.

Water discharged through the water supply portion groove 311 may be accommodated in the drain member 260 positioned vertically below the water supply portion 310 and discharged to the drain pan 250.

Accordingly, the water supply portion groove 311 may be positioned behind the front end of the drain member inlet 261.

In addition, the lower surface of the water supply portion 310 may have a structure inclined downward from the rear end toward the water supply portion groove 311, and when water overflows from the water supply portion 310, the lower surface of the water supply portion 310 can guide the water to be discharged into the water supply portion groove 311.

In detail, the water falling from the water supply portion 310 positioned on the upper bed 300*b* is not directed toward the front of the light assembly 400 by the inclined portion 418 provided in the light assembly 400, but is gathered by the extension rib 419 positioned at the rear end of the inclined portion 418, falls from the drainage portion 419*a* of the extension rib 419, is accommodated into the drain member 260, and can be stored in the drain pan 250.

In addition, water falling from the water supply portion 310 positioned in the lower bed 300*a* may be directly accommodated into the drain member 260 and stored in the drain pan 250.

A water collection portion 320 in which water supplied through the water supply portion 310 is stored may be formed in the bed 300. In addition, a water guide 330 may be recessed between the water supply portion 310 and the water collection portion 320. In other words, the water guide 330 may connect the water supply portion 310 and the water collection portion 320, and the water supplied to the water supply portion 310 may be supplied to the water collection portion 320 along the water guide 330.

The water supply portion 310 is positioned higher than the water collection portion 320, and water from the water supply portion 310 may naturally flow into the water collection portion 320. In addition, the water guide 330 may be formed to have an inclination that gradually decreases from the water supply portion 310 toward the water collection portion 320. Accordingly, when water is supplied to the water supply portion 310, water may be naturally supplied to the water collection portion 320 along the water guide 330.

Meanwhile, guide walls 331 may be formed on both sides of the water guide 330 to form the water guide 330. The guide wall 331 may extend from the water supply portion 310 to the water collection portion 320, and a pair of the guide wall may be spaced apart from each other to form both side surfaces of the water guide 330. In addition, the guide wall 331 may be formed to have a height corresponding to the height of the bed flange 301 to support the bed tray 350 from below.

The water guided from the water supply portion 310 to the water collection portion 320 by the water guide 330 may be directed toward the water collection portion 320 without overflowing to the outside. In particular, the bottom surface of the water guide 330 may be inclined at a height higher than that of the water collection portion 320 by the guide wall 331 extending upward. In addition, even in a situation where the height difference between the water supply portion 310 and the water collection portion 320 is not large, the water supplied to the water supply portion 310 does not overflow and can be directed to the water collection portion 320, and can provide a path with sufficient space to be guided smoothly. In other words, it provides a structure in which the water of the water supply portion 310 can be stably supplied without excessively deepening the recessed depth of the water collection portion 320, thereby increase in the thickness of the bed 300 in the upper and lower direction can be prevented, and thereby the bed 300 can have a slim structure.

In addition, the guide wall 331 and the water guide 330 may extend between a pair of pod seating portions 352 recessed in the bed tray 350. Accordingly, the guide wall 331 can be prevented from interfering when the bed tray 350 is seated, and a space for water supply can be secured through the space between the adjacent pod seating portions 352.

Meanwhile, in the central area of the bed 300, a water collection portion 320 for storing water supplied to the pod 10 may be recessed. The water collection portion 320 is more recessed than the bottom surface of the recessed portion 302 formed around the water collection portion 320 so that water supplied to the water supply portion 310 is existed only in the water collection portion 320 area in a state of being stored.

In detail, the water collection portion 320 is positioned in the center of the bed 300 and may extend from the left end to the right end of the bed 300. In addition, the water collection portion 320 may be formed to have a predetermined width in the front and rear direction so that all of the seating portion openings 351*a* formed in the bed tray 350 can be accommodated.

In addition, a bed protrusion 340 protruding upward may be formed in the central portion of the bed 300. A height of the bed protrusion 340 may be the same as or higher than that of the recessed portion 302. The bed protrusion 340 may be positioned in the center of the water collection portion 320. Accordingly, the water collection portion 320 may have a closed loop shape, and water flowing thereinto through the water guide 330 may flow along the inside of the closed loop shape of water collection portion 320. In addition, in the area of the water collection portion 320, a portion positioned in front of the bed protrusion 340 may be referred to as a front water collection portion 321, and a portion positioned at the rear of the bed protrusion 340 may be referred to as a rear side a water collection portion 322.

In addition, a distance between the outer end of the water collection portion 320 and the bed protrusion 340 may be greater than the width of the seating portion opening 351*a* in the front and rear direction. Accordingly, when the bed tray 350 is seated, the seating portion opening 351*a* may be disposed along the water collection portion 320.

The widths of the front-side water collection portion 321 and the rear-side water collection portion 322 in the front and rear direction in which the seating portion opening 351*a* is positioned may be the same as or slightly larger than the width of the pod seating portion 352 in the front and rear direction and thus there is a structure in which an appropriate amount of water required for water supply to the pod 10 can be effectively supplied to the pod 10. In addition, unnecessary water is prevented from remaining in the water collection portion 320 for a long time to prevent contamination of the bed 300 and to always maintain the bed in a clean state.

Meanwhile, a detection portion 323 may be formed in an inner area of the water collection portion 320. The detection portion 323 may be formed at a position corresponding to the residual water detection device 742 positioned below. Accordingly, in a state where the bed 300 is fully introduced, the residual water detection device 742 may have a structure capable of being in close contact with the detection portion 323.

In this case, the detection portion 323 may have a shape that protrudes when viewed from above and is recessed when viewed from below. Accordingly, it is possible to prevent the residual water detection device 742 from interfering with the detection portion 323 in the process of introducing and withdrawing the bed 300, thereby preventing the occurrence of an obstacle in introducing and withdrawing the bed 300.

In addition, due to the structure of the protruding detection portion 323, water supplied to the detection portion 323 does not accumulate, and it is possible to accurately determine whether additional water supply is needed to the water collection portion 320.

A bed handle 361 may be formed on the front surface of the bed 300. The bed handle 361 may have a structure in which a lower surface is recessed so that a user can hold the bed handle at the time of introduction and withdrawal of the bed 300. In addition, the front surface of the bed handle 361 may be formed of the same material as the tank handle 711 or may be formed of a material of the same texture to have a sense of unity.

Meanwhile, the bed tray 350 is seated on the upper surface of the bed 300 and may form an outer appearance of an upper surface of the bed 300. The bed tray 350 may be formed of a metal material such as stainless to keep the outer appearance neat and hygienically managed.

The bed tray 350 is formed in a size capable of shielding the upper surface of the bed 300 and may be formed in a plate shape. Accordingly, in a state where the bed tray 350 is mounted on the bed 300, the upper surface of the bed 300 is formed In addition, a plurality of pod seating portions 352 on which the pods 10 are seated may be formed in the bed tray 350. The pod seating portion 352 is recessed in a shape corresponding to the pod 10 so that the pod 10 can be seated, and a plurality of pod seating portions 352 may be sequentially disposed. Accordingly, a plurality of the pods 10 may be disposed on the bed tray 350.

A plurality of the pod seating portions 352 may be disposed in the front half portion and the rear half portion based on the center and may be formed in the same size. In addition, a seating portion opening 351*a* may be formed in the pod seating portion 352. The seating portion opening 351*a* allows the pod protrusion 16 protruding from the lower surface of the pod 10 to pass through, and allows the pod protrusion 16 to be in contact with the water inside the water collection portion 320.

The seating portion opening 351*a* may be formed for each of the pod seating portions 352. In addition, the seating portion openings 351*a* respectively formed in the plurality of pod seating portions 352 may be disposed along an area corresponding to the water collection portion 320.

In detail, when the bed tray 350 is seated on the bed 300, the seating portion opening 351*a* is positioned on the water collection portion 320 so that water stored in the water collection portion 320 can be supplied to the pod 10 through the seating portion opening 351*a*.

In this embodiment, the water collection portion 320 is disposed in the horizontal direction in the center of the bed 300, so that the seating portion openings 351*a* may be also formed in a position close to the center side of the bed tray 350 to be positioned on the upper side corresponding to the inside of the water collection portion 320. In more detail, all of the seating portion openings 351*a* formed in the pod seating portion 352 disposed in front of the bed 300 are positioned adjacent to the rear end of the pod seating portion 352, and all the seating portion openings 351*a* formed in the pod seating portion 352 disposed at the rear of the bed 300 may be positioned adjacent to the front end of the pod seating portion 352. In other words, the seating portion openings 351*a* may be continuously disposed along the inner area of the water collection portion 320.

Hereinafter, a structure in which the water of the water collection portion 320 is supplied to the pod 10 will be described in more detail with reference to the drawings.

Figure 29:
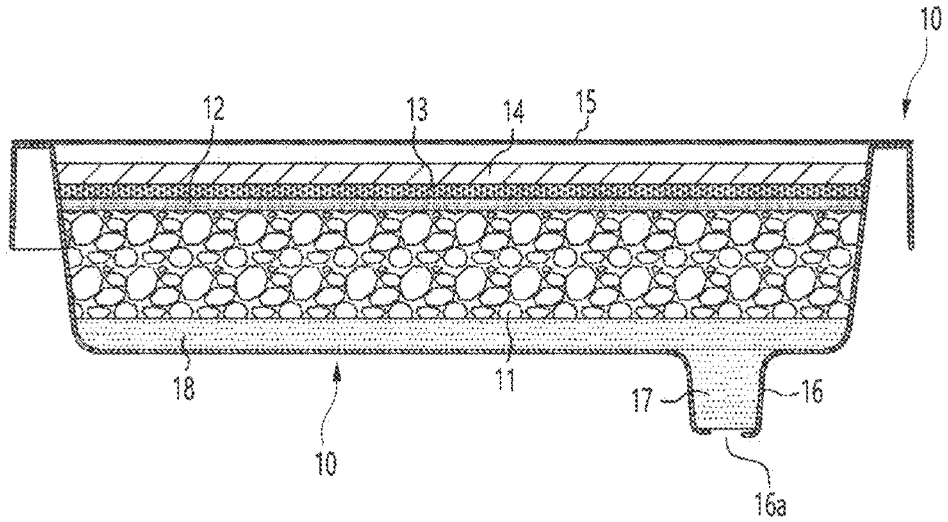
FIG. 29 is a cross-sectional view illustrating a pod seated on the apparatus for cultivating plants.
Figure 30:
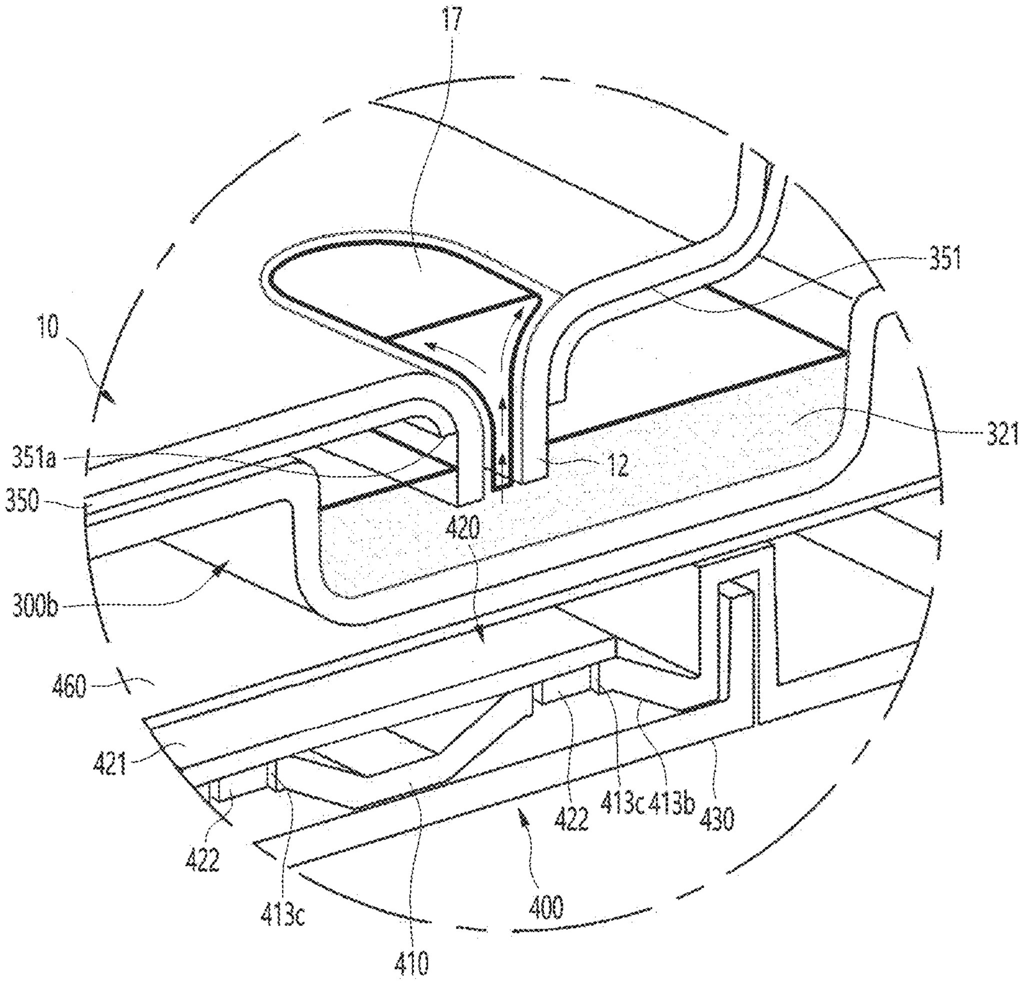
FIG. 30 is an enlarged view illustrating part “C” of FIG. 4.

FIG. 29 is a cross-sectional view illustrating a pod seated on the apparatus for cultivating plants, and FIG. 30 is an enlarged view illustrating part "C" of FIG. 4.

As illustrated, the pod 10 may be configured by types of plants that can be cultivated with the apparatus for cultivating plants 1. Of course, each of the pods 10 composed of several types of plants may all have the same size and may have a size set to be accommodated in the pod seating portion 352. Accordingly, the user can select the pod 10 of the plant desired to be cultivated and seat the pod at a desired position on the bed 300 to start cultivation.

In detail, the pod 10 may have an outer shape formed by a container opened upward. Top soil 11 containing a nutrient solution material (not illustrated) is filled in the pod 10. The nutrient solution material is a material containing nutrients supplied to plants to grow better. Such a nutrient solution material may be provided in the form of a water-soluble capsule that is gradually dissolved in water and may be configured to be contained in the feed water while gradually dissolving each time the feed water is supplied.

A seed paper 12 is provided on the upper surface of the top soil 11. The seed paper 12 may be composed of a sheet in which seeds are disposed to have a predetermined arrangement. When feed water is supplied in a state where the seed paper 12 is seated on the upper surface of the top soil 11, the seed paper 12 melts and disappears, and the seeds remain in the top soil 11.

A brick 13 is provided on the upper surface of the seed paper 12. The brick 13 is configured to adjust the moisture and humidity of the soil and prevent the formation of mold, and is made by processing inorganic ore such as vermiculite into a powder state and then pressing the powder state of the inorganic orc.

In addition, the upper surface of the pod 10 is covered with a protective paper 15 to protect the inside thereof. In particular, a packing member 14 is further provided between the upper surface of the brick 13 and the protective paper 15 to protect the brick 13 from the external environment. In addition, the type of plant to be cultivated may be printed on the protective paper 15 to provide information about the pod to the user.

Meanwhile, a protrusion 16 protruding downward is formed on the bottom surface of the pod 10, and a water-through hole 16*a* may be formed on the bottom surface of the protrusion 16. The protrusion 16 may be formed in a pipe structure with an empty inside while being opened up and down.

A first absorbing member 17 for absorbing water supplied to the beds 300*a* and 300*b* may be provided in the protrusion 16, and a second absorbing member 18 having a flat plate shape may be provided between the first absorbing member 17 and the top soil. The second absorbing member 18 functions to evenly supply the feed water absorbed by the first absorbing member 17 to the entire area of the top soil 11.

When the pod 10 is seated on the pod seating portion 352, the pod protrusion 16 may protrude downward through the seating portion opening 351*a*. At this time, the pod protrusion 16 is positioned inside the water collection portion 320, that is, the front water collection portion 321. When water is supplied to the inside of the water collection portion 320 in this state, the pod protrusion 16 can come into contact with the water inside the water collection portion 320. In addition, the water of the water collection portion 320 may flow thereinto through the water-through hole 16*a*, and along the first absorbing member 17 and the second absorbing member 18 inside the pod protrusion 16, water may be absorbed. In addition, the water absorbed through the first absorbing member 17 and the second absorbing member 18 may be uniformly supplied to the top soil of the pod 10.

Hereinafter, an operation of the apparatus for cultivating plants 1 according to an embodiment of the present disclosure having the above structure will be described.

The user selects a plant to be cultivated, removes the protective paper of the corresponding pod, and then seats the plant on the bed. When the pod 10 is seated on the bed 300, a predetermined amount of water stored in the water tank 700 is supplied to the bed 300.

At this time, the amount of water supplied is a set amount and may be slightly less than the amount to be sufficiently supplied to the pod 10. Accordingly, the supplied water may be absorbed from the water collection portion 320 to the pod 10, and when a predetermined time elapses, the supplied water is completely absorbed so that no water remains in the water collection portion 320.

When the residual water detection device 742 detects that there is no water in the water collection portion 320, the residual water detection device 742 supplies again the predetermined amount of water and again detects that there is no water left in the water collection portion 320, the controller 90 detects the time at this time and thus determines whether the set time has elapsed.

While repeating this process, the predetermined amount of water is continuously supplied and the time taken to be absorbed by the pod 10 is measured. If the time for which no water remains in the water collection portion 320 after water supply has elapsed for a set time, it is determined that sufficient water has been supplied and the water supply is stopped for a certain period of time. In addition, when the conditions for supplying water again are satisfied, water-supply is started again.

Accordingly, the water collection portion 320 does not maintain a state of being accommodated for a long time, and the amount of water required for plant growth can be supplied in a timely manner. In addition, nutrients necessary for plant growth are supplied in the form of a nutrient solution contained in the pod 10 so that the plants inside the pod 10 can grow effectively.

Meanwhile, light is irradiated toward the plant growing in the bed 300 by the operation of the light assembly 400. The light assembly 400 may be turned on and off at an appropriate time period according to the growth state and environment of the plant. In particular, by turning the light assembly 400 on and off according to the actual amount of sunlight according to the season, it is possible to provide an environment similar to that in which plants inside the apparatus for cultivating plants 1 grow in an external natural environment.

Plants in the bed 300 perform photosynthesis by the light provided by the light assembly 400, and carbon dioxide necessary for this process may be supplied through the air flowing into the cultivation space.

Meanwhile, in a case where the temperature inside the cultivation space 101 is too low, the heater is driven, and in a case where the temperature inside the cultivation space 101 is too high, the refrigeration cycle is driven and the evaporator 630 performs a cooling action.

Air heated or cooled by the heater or evaporator 630 is discharged forward through the blower assembly 500. At this time, air flows from the rear end of the light assembly 400 to the front, and the lower surface of the light assembly 400 is cooled during the air flow process.

Then, the air moved forward is moved downward and then flows from the front end of the bed 300 to the rear end of the bed 300. Stems and leaves of plants grown in the bed 300 are shaken by the flow of air flowing from the upper surface of the bed 300, so that the state of the cultivated plants can be remarkably improved.

The air flowing into the rear end of the bed 300 passes through again the space in which the evaporator 630 and the heater are disposed and may be discharged toward the light assembly 400 by the blower fan 520.

The air flowing by the operation of the blower fan 520 circulates inside the cultivation space 101, and continuously air-cools the light assembly 400 during the circulation process and facilitates the growth of food in the bed 300.

In addition, by continuously and uniformly heating and cooling the inside of the cultivation space 101 through a repeated air circulation process, the entire cultivation space 101 may maintain a set temperature.

The user can check the state inside the cultivation space 101 through the door 130, and when the plants in the cultivation space 101 reach a harvestable state, the plants are harvested. In addition, if plant management is necessary before harvest, an appropriate operation is performed, and unnecessary crops may be discarded or the harvested pod 10 may be removed.

This harvesting and management operation may be performed by a user along the guidance through the display assembly 800, or information may be transmitted to a device carried by the user to guide the user's harvesting and management operation.

INDUSTRIAL APPLICABILITY

The apparatus for cultivating plants according to an embodiment of the present disclosure has high industrial applicability because hygiene is improved.

What is claimed is:

1. An apparatus for cultivating plants comprising:
a cabinet defining a cultivation space;
a bed provided in the cultivation space and on which pods configured to contain seeds and nutrients for plants are seated;
a water tank configured to supply water to the bed;
a pipe guide recessed along a side surface of the cultivation space;
a water supply pipe accommodated inside the pipe guide and configured to guide water from the water tank to the bed;
a guide cover shielding at least of a portion of the pipe guide; and
a water supply pipe mount formed on the guide cover and fixing an end of the water supply pipe extending toward the bed,
wherein the guide cover includes a cutout formed on an upper side of the bed and cut in a shape that is recessed inward from one end of the guide cover, and
wherein the water supply pipe mount is formed by bending so as to extend in a direction intersecting from an inner end of the cutout.

2. The apparatus for cultivating plants of claim 1,
wherein the bed is provided in a plurality, the plurality of beds being disposed in a vertical direction, and
wherein the pipe guide is formed to extend vertically along a rear side of the cultivation space.

3. The apparatus for cultivating plants of claim 2,
wherein the water supply pipe is provided in a plurality, a number of the plurality of water supply pipes corresponding to a number of the plurality of beds to provide independent water supply flow paths to the beds.

4. The apparatus for cultivating plants of claim 1,
further comprising bed rails arranged on both sides of the bed, and connecting the bed and a side surface of the cultivation space to guide a withdrawal and introduction of the bed, and
wherein the pipe guide is disposed further outside than the bed rails.

5. The apparatus for cultivating plants of claim 1,
wherein the guide cover is formed in a metal plate shape, and
wherein the water supply pipe mount is formed by bending the guide cover.

6. The apparatus for cultivating plants of claim 1,
wherein the water supply pipe mount includes:
a bent portion extending vertically from the inner end of the cutout;
an upper fixing portion bent rearwardly from an upper end of the bent portion; and
a lower fixing portion bent rearwardly from a lower end of the bent portion, and
wherein the water supply pipe is inserted between the upper fixing portion and the lower fixing portion.

7. The apparatus for cultivating plants of claim 1,
wherein a guide groove is formed at a bottom of the cutout, and the guide groove is recessed downward and receives an outer surface of the water supply pipe extending in a vertical direction.

8. The apparatus for cultivating plants of claim 1,
wherein a water supply part is formed at one of ends of rear left and right sides of the bed adjacent to the pipe guide, and protrudes backward, and
the water supply pipe mount extends to an upper part of the water supply part.

9. The apparatus for cultivating plants of claim 1, wherein a sleeve is formed of a metal material through which the water supply pipe passes at an end of the water supply pipe, and the sleeve extends from the pipe guide to the bed.

10. The apparatus for cultivating plants of claim 9, wherein the sleeve comprises:

a sleeve extension portion inserted into the water supply pipe mount;

an inner bending portion bent inwardly from one end of the sleeve extension portion to an inside of the cutout; and an outer bending portion bent toward an upper surface of the bed from the other end of the sleeve extension portion.

11. The apparatus for cultivating plants of claim 9, further comprising a coil member formed on an outer surface of at least a portion of the water supply pipe inside the pipe guide, made of a metal material, and wound on the outer surface of the water supply pipe, allowing the water supply pipe to maintain a bent shape.

12. The apparatus for cultivating plants of claim 1, wherein a machine room separated from the cultivation space, where a compressor and a condenser are placed, is disposed at a bottom of the cabinet, and wherein a stepped portion protruding upward is formed on a bottom surface of the cultivation space to provide a space for placing the compressor.

13. The apparatus for cultivating plants of claim 12, wherein the pipe guide comprises:

a first vertical portion extending along a front end of the stepped portion from the bottom surface of the cultivation space, a first horizontal portion extending rearwardly along a top end of the stepped portion from a top end of the first vertical portion, and a second vertical portion extending upwardly along a side rear end of the cultivation space from a rear end of the first horizontal portion.

14. The apparatus for cultivating plants of claim 13, wherein the guide cover is positioned to shield the second vertical portion.

15. The apparatus for cultivating plants of claim 13, further comprising:

a water pump for supplying water from the water tank to the bed; and a water supply valve connecting an outlet of the water pump and the water supply pipe, wherein the water tank is provided in front of the stepped portion, and wherein the water pump and the water supply valve are disposed between the water tank and a front surface of the stepped portion.

16. The apparatus for cultivating plants of claim 15, wherein the bed is disposed to shield an upper surface of the water tank and an upper surface of the stepped portion, and wherein the first vertical portion and the first horizontal portion are shielded by the bed.

17. The apparatus for cultivating plants of claim 1, further comprising an evaporator mounted on a rear wall of the cultivation space.

18. The apparatus for cultivating plants of claim 17, further comprising a blower assembly disposed in front of the evaporator, forming at least a portion of a rear surface of the cultivation space, and configured to circulate air in the cultivation space, and wherein the water supply pipe mount is disposed in a rear of the blower assembly and is not exposed to the outside.

19. The apparatus for cultivating plants of claim 1, further comprising an inner case made of metal material forming an inner surface of the cultivation space, and wherein the pipe guide is formed in a tubular shape with one side open, and is coupled to an opening on an outer surface of the inner case.

* * * * *